(12) United States Patent
Moriyama et al.

(10) Patent No.: US 10,914,338 B2
(45) Date of Patent: Feb. 9, 2021

(54) TELESCOPIC SHAFT

(71) Applicant: NSK Ltd., Tokyo (JP)

(72) Inventors: Seiichi Moriyama, Maebashi (JP); Masaki Takahashi, Maebashi (JP); Shoji Kido, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 16/320,505

(22) PCT Filed: Jul. 26, 2017

(86) PCT No.: PCT/JP2017/027119
§ 371 (c)(1),
(2) Date: Jan. 25, 2019

(87) PCT Pub. No.: WO2018/021443
PCT Pub. Date: Feb. 1, 2018

(65) Prior Publication Data
US 2019/0277333 A1  Sep. 12, 2019

(30) Foreign Application Priority Data
Jul. 26, 2016  (JP) ................................. 2016-146532

(51) Int. Cl.
*F16C 3/03* (2006.01)
*B62D 1/20* (2006.01)
(Continued)

(52) U.S. Cl.
CPC .................. *F16C 3/03* (2013.01); *B62D 1/16* (2013.01); *B62D 1/20* (2013.01); *F16D 3/06* (2013.01);
(Continued)

(58) Field of Classification Search
CPC ........ F16C 3/03; F16C 2226/00; F16C 3/035; B62D 1/16; B62D 1/20; F16D 3/06; F16D 3/387; F16D 3/185
(Continued)

(56) References Cited

U.S. PATENT DOCUMENTS 1,541,007 A * 6/1925 Thiemer .................... F16D 3/06
464/16
1,979,969 A * 11/1934 Geyer ....................... F16C 3/02
(Continued)

FOREIGN PATENT DOCUMENTS

EP   2 787 235 A1   10/2014
JP   2006-46498 A   2/2006
(Continued)

OTHER PUBLICATIONS

Universal Joint and Design Manual, AE-7, Society of Automotive Engineers, Inc., Warrendale, PA, pp. 185-198, TJ1079.S62. (Year: 1979).*
(Continued)

*Primary Examiner* — Greg Binda
(74) *Attorney, Agent, or Firm* — Crowell & Moring LLP

(57) ABSTRACT

A structure capable of preventing improper wheel alignment even when, for example, an accident such as a collision accident, steered wheels riding on a curb, or the like occurs is realized. A telescopic shaft in which the inner shaft (9a) and the outer tube (10a) are combined with each other by a spline engagement between the male spline portion (45) provided on one end portion in the axial direction of the outer-circumferential surface of the inner shaft (9a) and the female spline portion (23) provided on the other end portion of the inner-circumferential surface of the outer tube (10a) such that torque can be transmitted and the entire length of the telescopic shaft can be extended and contracted, the
(Continued)

inner shaft (9a) having an inner-side small-diameter cylindrical portion (41) provided on a portion of the inner shaft (9a) that is located further on the other side than the edge of the other end in the axial direction of the outer tube (10a) and having an outer-diameter dimension that is smaller than the adjacent portions on both sides in the axial direction thereof, is provided.

7 Claims, 12 Drawing Sheets

(51) Int. Cl.
    *F16D 3/06*         (2006.01)
    *F16D 3/38*         (2006.01)
    *B62D 1/16*         (2006.01)
    *F16C 3/035*       (2006.01)

(52) U.S. Cl.
    CPC .............. *F16D 3/387* (2013.01); *F16C 3/035* (2013.01); *F16C 2226/00* (2013.01)

(58) Field of Classification Search
    USPC .......................................... 464/16, 162, 183
    See application file for complete search history.

(56) References Cited

U.S. PATENT DOCUMENTS

| | | | | |
|---|---|---|---|---|
| 2,650,484 | A | * | 9/1953 | Bujak ...................... F16D 1/108 |
| | | | | 464/162 |
| 3,813,899 | A | * | 6/1974 | Abrahamer ............... F16D 3/06 |
| | | | | 464/16 |
| 6,585,602 | B2 | | 7/2003 | Cermak et al. |
| 2006/0035714 | A1 | * | 2/2006 | Qu ............................ F16C 3/02 |
| | | | | 464/183 |
| 2007/0129154 | A1 | * | 6/2007 | Valovick ................... F16D 3/06 |
| 2009/0082116 | A1 | | 3/2009 | Baechle et al. |
| 2009/0277294 | A1 | | 11/2009 | Ishii |
| 2014/0174242 | A1 | | 6/2014 | Koyama |

FOREIGN PATENT DOCUMENTS

| | | |
|---|---|---|
| JP | 2007-186185 A | 7/2007 |
| JP | 2013-154742 A | 8/2013 |
| JP | 2014-114915 A | 6/2014 |
| JP | 2015-21596 A | 2/2015 |
| WO | WO 2013/031720 A1 | 3/2013 |

OTHER PUBLICATIONS

The Four Types of Steel, Metal Supermarkets, retrieved from the Internet Jul. 29, 2020, <https:///www.metalsupermarkets.com/types-of-steel/>. (Year: 2015).*

International Search Report (PCT/ISA/210) issued in PCT Application No. PCT/JP2017/027119 dated Oct. 31, 2017 with English translation (six pages).

Japanese-language Written Opinion (PCT/ISA/237) issued in PCT Application No. PCT/JP2017/027119 dated Oct. 31, 2017 (five pages).

Partial Supplementary European Search Report issued in counterpart European Application No. 17834445.3 dated Jun. 12, 2019 (13 pages).

Extended European Search Report issued in counterpart European Application No. 17834445.3 dated Sep. 11, 2019 (15 pages).

* cited by examiner

Prior Art

TELESCOPIC SHAFT

TECHNICAL FIELD

The present invention relates to a telescopic shaft applied, for example, to an intermediate shaft of a steering apparatus of an automobile.

BACKGROUND ART

FIG. 11 illustrates an example of a conventional steering apparatus for an automobile. In the illustrated steering apparatus, a steering wheel 1 is fixed to a rear-end portion of a steering shaft 2. A front-end portion of the steering shaft 2 is connected to a base-end portion of an input shaft 6 of a rack-and-pinion steering-gear unit 5 via a pair of universal joints 3a and 3b and an intermediate shaft 4. When the input shaft 6 rotates, a pair of right and left tie rods 7 are pushed and pulled by the steering-gear unit 5, and a steering angle according to the operation amount of the steering wheel 1 is applied to a pair of left and right steered wheels.

In order to prevent vibration from being transmitted to the steering wheel 1 by absorbing vibrations inputted from the wheels during operation, or in order to assemble the intermediate shaft in the vehicle body with the total length thereof reduced, a telescopic type structure is applied to the intermediate shaft 4, for example. Incidentally, the telescopic type structure includes a structure that does not extend or contract in the normal state, but that extends or contracts only at the time of a collision.

FIG. 12 illustrates a structure of a telescopic intermediate shaft 4 described in JP2015-021596 A. The intermediate shaft 4 includes a solid inner shaft 9 having a male spline portion 8 on the outer-circumferential surface on one side in the axial direction (left side in FIG. 12, on the side of an outer tube 10 in the assembled state), and a circular tube-shaped outer tube 10 having a female spline portion 12 on the inner-circumferential surface capable of spline engagement with the male spline portion 8. The inner shaft 9 and the outer tube 10 are combined by spline engagement between the male spline portion 8 and the female spline portion 12 so as to be able to extend or contract freely.

In the illustrated example, the inner shaft 9 is arranged on the rear side, and the outer tube 10 is arranged on the front side. In other words, in the illustrated example, the front side corresponds to one side in the axial direction and the rear side corresponds to the other side in the axial direction. It should be noted that the front-rear direction is the front-rear direction of the vehicle body. A first yoke 11 of a rear-side universal joint 3a of the pair of universal joints 3a, 3b is externally fitted and fixed to the other end portion in the axial direction of the inner shaft 9. A second yoke 13 of a front-side universal joint 3b of the pair of universal joints 3a, 3b is externally fitted and fixed to one end portion in the axial direction of the outer tube 10. Incidentally, the connection between the inner shaft 9 and the first yoke 11, and/or the connection between the outer tube 10 and the second yoke 13 can also be performed by welding.

PRIOR ART DOCUMENTS

Patent Literature

Patent Literature 1: JP2015-021596 A

DISCLOSURE OF INVENTION

Technical Problems to Be Solved by the Invention

In a steering apparatus having the intermediate shaft 4, for example, when an impactive moment load is applied to the steering wheel due to an accident such as a collision accident, the steered wheels riding up on a curb, or the like, there is a possibility that the pair of tie rods 7 will deform and the wheel alignment will become improper.

In consideration of the circumstances described above, an object of the present invention is to achieve a structure capable of preventing improper wheel alignment even when, for example, an accident such as a collision accident, steered wheels riding on a curb, or the like occurs.

Means for Solving the Problems

The telescopic shaft of the present invention includes a hollow shaped outer tube arranged on one side in an axial direction, and a hollow shaped inner shaft arranged on the other side in the axial direction. The inner shaft includes an outer-circumferential surface, an inner-circumferential surface, and a male spline portion that is provided on the one side in the axial direction of the outer-circumferential surface. The outer tube includes an outer-circumferential surface, an inner-circumferential surface, and a female spline portion that is provided on the other side in the axial direction of the inner-circumferential surface.

The inner shaft and the outer tube are combined with each other by a spline engagement between the male spline portion and the female spline portion such that torque can be transmitted and the entire length of the telescopic shaft can be extended and contracted.

The inner shaft comprises a small-diameter portion provided in a middle portion in the axial direction that is located further on the other side in the axial direction than the male spline portion, or in a middle portion in the axial direction on the other side in the axial direction of the inner shaft, and has an outer-diameter dimension that is smaller than that of portions adjacent to both sides in the axial direction of the small-diameter portion.

The outer-circumferential surface of the small-diameter portion has a cylindrical surface portion, the outer-diameter dimension of which does not change in the axial direction, and a pair of continuous curved surface portions formed in portions adjacent to both sides in the axial direction of the cylindrical surface portion.

Each of the pair of continuous curved surface portions is such that the outer-diameter dimension becomes small going toward the cylindrical surface portion, and the edge on the end in the axial direction on the side close to the cylindrical surface portion is smoothly continuous with the edge of the end in the axial direction of the cylindrical surface potion.

The inner shaft may comprise a stopper member around the circumference of the small-diameter portion that is capable of engaging in the axial direction with the other end portion in the axial direction of the outer tube directly or via another member.

The inner shaft may further comprise a coating layer that covers the outer-circumferential surface of the male spline portion, and the spline engagement between the male spline portion and the female spline portion is via the coating layer.

The portion of the inner shaft in which the male spline portion is provided may comprise a thin-wall portion that is provided on the one end portion in the axial direction, and a thick-wall portion that is provided further on the other side in the axial direction than the thin-wall portion, the thick-wall portion having a thickness dimension in the radial direction that is larger than the thickness dimension in the radial direction of the thin-wall portion.

The inner shaft may be configured such that the inner-circumferential surface of the inner shaft includes a large-diameter hole portion that is located on the one side of the axial direction, a medium-diameter hole portion that is located further on the other side in the axial direction than the large-diameter hole portion, and a small-diameter hole portion that is located further on the other side in the axial direction than the medium-diameter hole portion; in which and a continuous stepped portion that is located between the medium-diameter hole portion and the small-diameter hole portion is positioned in the axial direction further on the one side in that axial direction than the edge of the other end in the axial direction of the male spline portion, and thereby an inward-projecting portion that projects inward in the radial direction around the entire circumference is provided on the other end portion in the axial direction of the inner-circumferential surface of the male spline portion.

In this case, at least part of the portion of the male spline portion where the thick-wall portion is provided on the outer-circumferential surface can always be engaged with the female spline portion with the spline engagement within the range of the extending and contracting stroke of the inner shaft and the outer tube during use.

In addition, the cross-sectional area of the thick-wall portion and the cross-sectional area of the portion between the small-diameter portion and the male spline portion can be the same.

The telescopic shaft of the present invention may further comprise a yoke portion, and in this case, the yoke portion may be connected to and fixed to the inner shaft by an outward-facing flange portion that is provided on the other end portion in the axial direction of the inner shaft.

The inner shaft may be made of a carbon steel for machine structures having a carbon content of 0.35% by mass or less and may be configured such that the outer diameter of the portions adjacent to both sides in the axial direction of the small-diameter portion is 15 mm to 18 mm, the outer diameter of the cylindrical surface portion is 14 mm to 16 mm, the length in the axial direction of the small-diameter portion is 10 mm to 50 mm, the inner diameter of the small-diameter portion is 9 mm to 15 mm, the thickness in the radial direction of the portions adjacent to both sides in the axial direction of the small-diameter portion is 1.5 mm to 3.0 mm, and the radius of curvature of the cross-sectional shape of the continuous curved portion is 2 mm or more.

Advantageous Effects of the Invention

With the telescopic shaft of the present invention, it is possible to prevent the wheel alignment from becoming improper, for example, even when an accident such as a collision accident, steered wheels riding up on a curb, or the like occurs. In other words, in the present invention, the inner shaft has a small-diameter portion in a middle portion in the axial direction. Therefore, when a moment load acts on the steered wheels due to a collision accident, steered wheels riding up on the curb, or the like, for example, before the other component parts of the steering apparatus such as tie rods or the like are deformed or damaged, the small-diameter part is deformed. When such a moment load is absorbed by such deformation of the small-diameter portion, deformation of the other component parts is prevented and improper wheel alignment is prevented.

MODE FOR CARRYING OUT THE INVENTION

First Example

Figure 1:
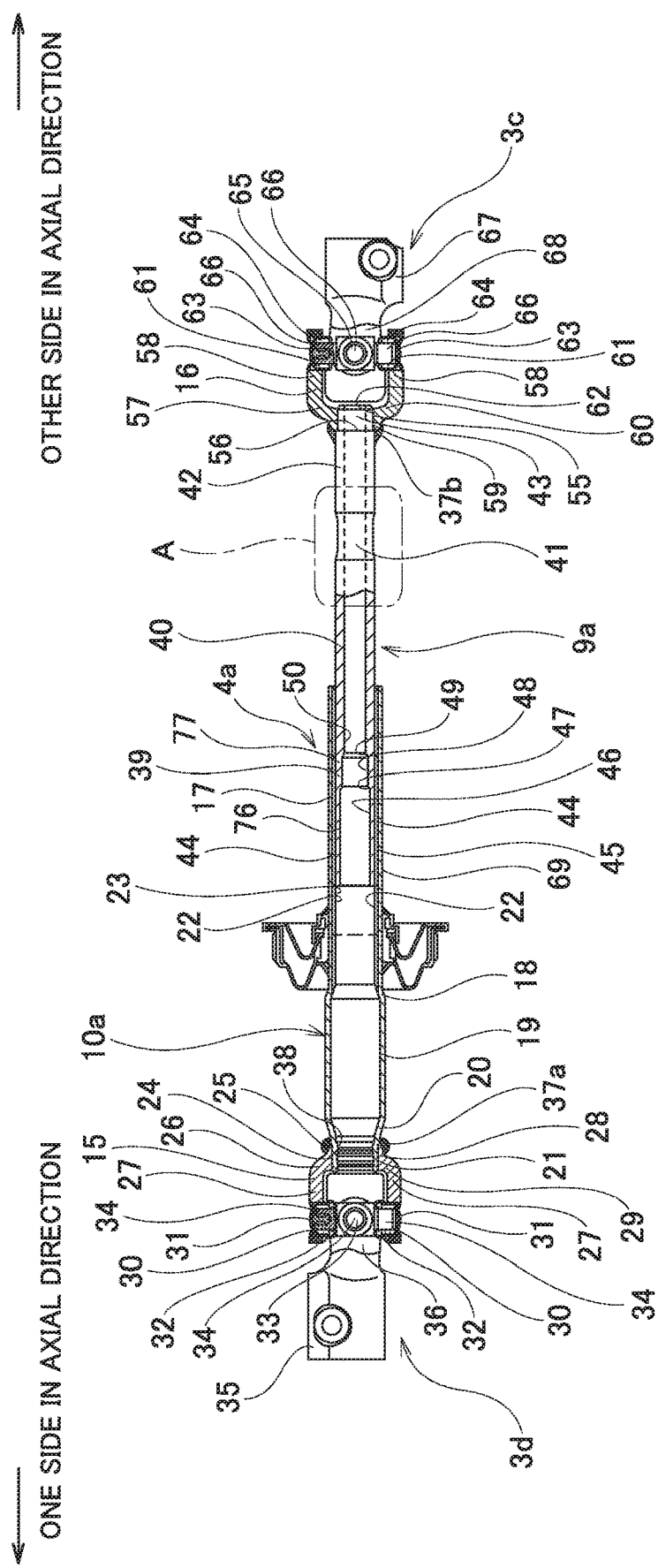
FIG. 1 is a partial cutaway side view illustrating an intermediate shaft of a first example of an embodiment of the present invention.
Figure 2:
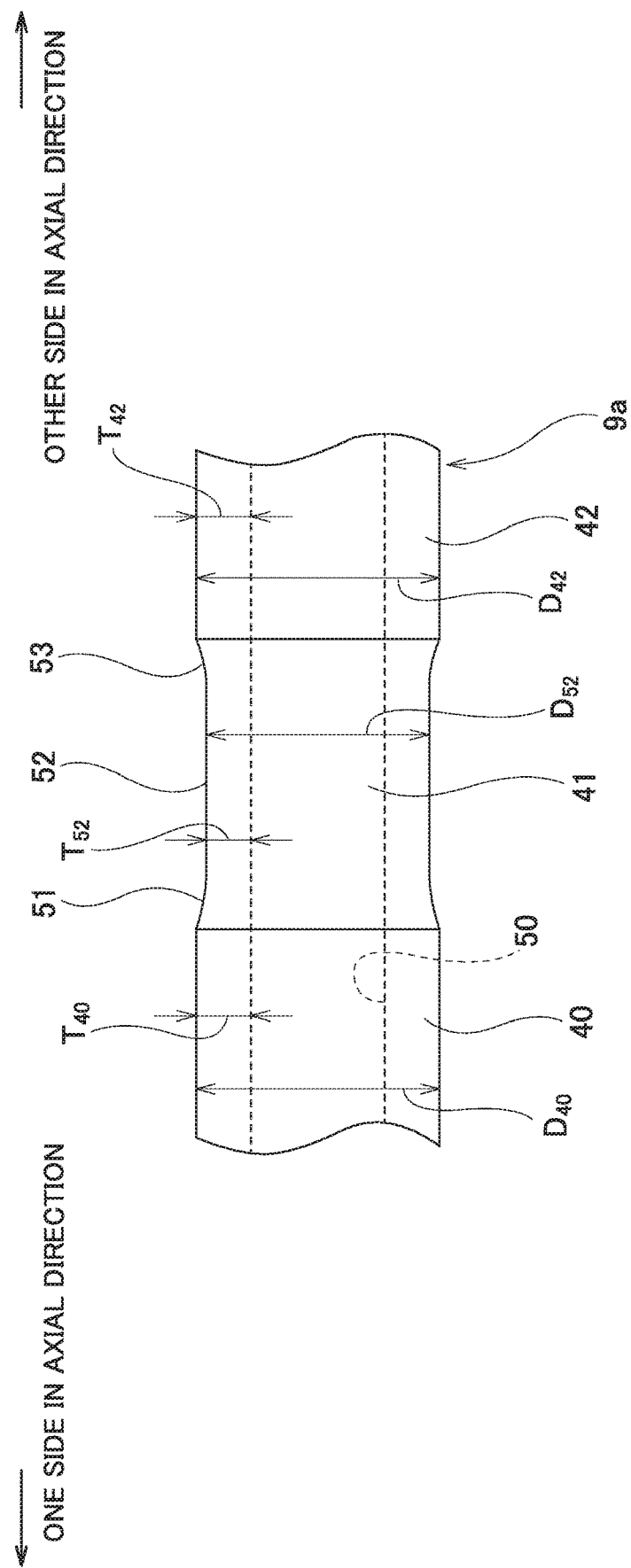
FIG. 2 is a partial enlarged view corresponding to part A in FIG. 1.
Figure 11:
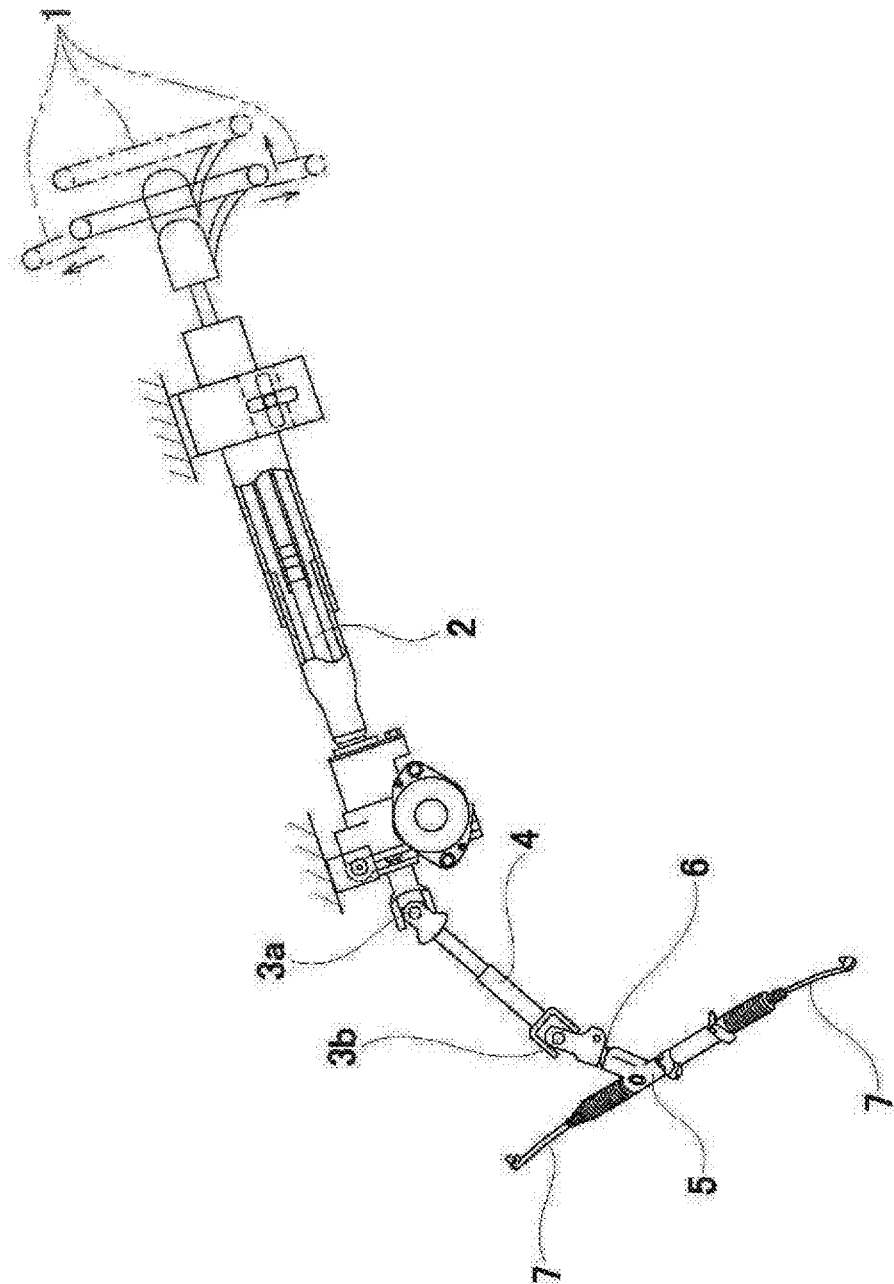
FIG. 11 is a partial cutaway side view illustrating an example of conventional construction of a steering apparatus.
Figure 12:
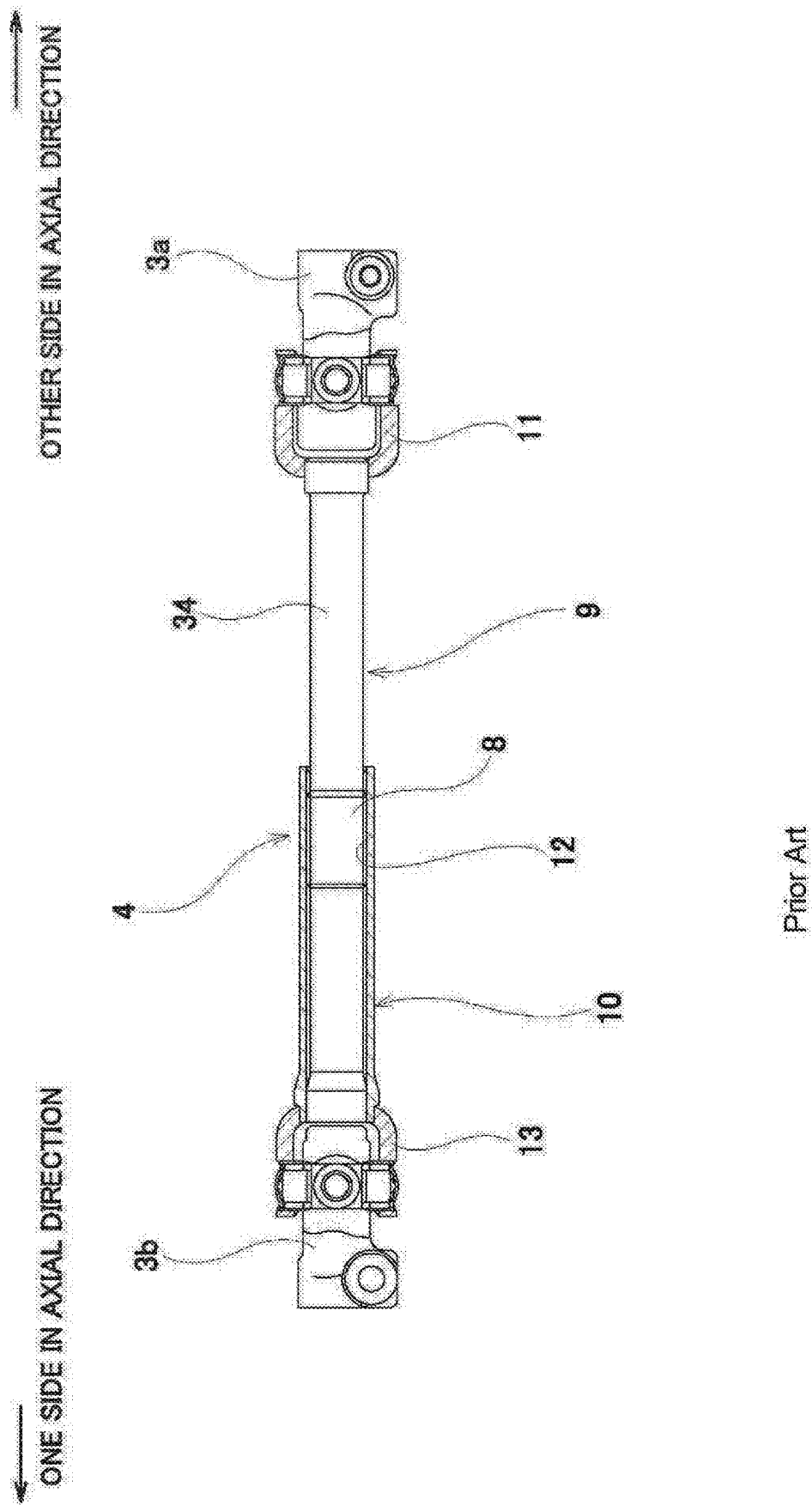
FIG. 12 is a cross-sectional view illustrating an example of conventional construction of an intermediate shaft.

FIG. 1 and FIG. 2 illustrate a first example of an embodiment of the present invention. It should be noted that in the present example, the present invention is applied to an intermediate shaft of a steering apparatus. However, in addition to an intermediate shaft as illustrated in the drawings, the present invention can be widely applied to shafts having a telescopic structure. The steering apparatus in which the intermediate shaft 4a of this example is assembled has the same construction as the steering apparatus illustrated in FIG. 11. However, the intermediate shaft 4a of the present example is not limited to the construction of the steering apparatus illustrated in FIG. 11, but can also be assembled into various types of steering apparatuses.

The steering apparatus in which the intermediate shaft 4a of this example is assembled is such that a steering wheel 1 (refer to FIG. 11) is fixed to a rear end portion of a steering shaft 2. The front-end portion of the steering shaft 2 is connected to a base-end portion of an input shaft 6 of a rack-and-pinion type steering-gear unit 5 via a pair of universal joints 3c and 3d and the intermediate shaft 4a. When the input shaft 6 rotates, a pair of right and left tie rods 7 are pushed and pulled by the steering-gear unit 5, and a steering angle according to the operation amount of the steering wheel 1 is applied to a pair of left and right steered wheels.

Hereinafter, specific construction of the intermediate shaft 4a will be described. The intermediate shaft 4a includes a hollow outer tube 10a arranged on one side in the axial direction (the left side in FIG. 1, the outer tube 10a side in the assembled state), and a hollow inner shaft 9a arranged on the other side in the axial direction (the right side in FIG. 1: the inner shaft 9a side in the assembled state). The intermediate shaft 4a further includes an outer-side yoke portion 15 attached to the end portion on the one side in the axial direction of the outer tube 10a and an inner-side yoke portion 16 attached to the end portion on the other side in the axial direction of the inner shaft 9a.

A male spline portion 45 is provided on the one side in the axial direction of the outer-circumferential surface of the inner shaft 9a. Moreover, a female spline portion 23 is provided on the other side in the axial direction of the inner-circumferential surface of the outer tube 10a. The intermediate shaft 4a is configured such that the male spline portion 45 on the one side in the axial direction of the inner shaft 9a and the female spline portion 23 on the other side in the axial direction of the outer tube 10a are combined by a spline engagement and thereby torque can be transmitted and the entire length of the intermediate shaft 4a can be extended and contracted. Incidentally, the telescopic structure of the telescopic shaft including the intermediate shaft 4a includes a structure that does not extend or contract in the normal state, but extends or contracts only at the time of a collision.

The outer tube 10a is made of metal, for example, and includes in order starting from the other side in the axial direction, an outer-side small-diameter cylindrical portion 17, an outer-side first inclined portion 18, an outer-side large-diameter cylindrical portion 19, an outer-side second inclined portion 20, and an outer-side fitting cylindrical portion 21.

The outer-side small-diameter cylindrical portion 17 is cylindrical, and is provided on the other side in the axial direction of the outer tube 10, or in other words, a portion extending from the other end portion in the axial direction of the outer tube 10a to the middle portion in the axial direction. The outer-circumferential surface of the outer-side small-diameter cylindrical portion 17 has a cylindrical surface shape, the outer diameter dimension of which does not change over the entire length in the axial direction. The female spline portion 23 is provided on the inner-circumferential surface of the outer-side small-diameter cylindrical portion 17, and has a configuration in which a plurality of concave portions and convex portions 22, each of which extends over the entire length in the axial direction, are alternately arranged in the circumferential direction.

The outer-side first inclined portion 18 has a conical cylindrical shape in which the inner-diameter dimension and the outer-diameter dimension become larger going toward the one side in the axial direction. The edge on the other end in the axial direction of the outer-side first inclined portion 18 is integrally continuous with the edge of the one end in the axial direction of the outer small-diameter cylindrical portion 17.

The outer-side large-diameter cylindrical portion 19 has a cylindrical shape, the inner-diameter dimension and the outer-diameter dimension of which do not change over the entire length in the axial direction. The edge of the other end in the axial direction of the outer-side large-diameter cylindrical portion 19 is integrally continuous with the edge of the one end in the axial direction of the outer-side first inclined portion 18. Incidentally, the outer-diameter dimension of the outer-side large-diameter cylindrical portion 19 is larger than the outer-diameter dimension of the outer-side small-diameter cylindrical portion 17. The inner-diameter dimension of the outer-side large-diameter cylindrical portion 19 is larger than the inner-diameter dimension of the outer-side small-diameter cylindrical portion 17 (the diameter of the inscribed circle of the convex portion 22 of the female spline portion 23), and is smaller than the outer-diameter dimension of the outer-side small-diameter cylindrical portion 17. The inner-diameter dimension of the outer-side large-diameter cylindrical portion 19 is larger than the diameter of the circumscribed circle of the convex portion 44 of the male spline portion 45 of the inner shaft 9a (spline-formed cylindrical portion 39) described later.

The outer-side second inclined portion 20 has a substantially conical cylindrical shape, the inner-diameter dimension and the outer-diameter dimension of which become smaller going toward the one side in the axial direction. The edge of the other end in the axial direction of the outer-side second inclined portion 20 is integrally continuous with the edge of the one end in the axial direction of the outer-side large-diameter cylindrical portion 19.

The outer-side fitting cylindrical portion 21 is located on the one end portion in the axial direction of the outer tube 10a. The outer-side fitting cylindrical portion 21 has a male serration 24 on the outer-circumferential surface in which a plurality of concave portions and convex portions extending in the axial direction are alternately arranged in the circumferential direction. The edge on the other end in the axial direction of the outer-circumferential surface (male serration 24) of the outer-side fitting cylindrical portion 21 and the edge on the one end in the axial direction of the outer-circumferential surface of the outer-side second inclined portion 20 are continuous via an outer-side stepped portion 25.

The outer-side yoke portion 15 constitutes a universal joint 3d, and includes a base portion 26 and a pair of arm portions 27.

The base portion 26 includes, for example, a tubular portion 28 having a cylindrical or square tubular shape and an annular portion 29. The annular portion 29 is provided so as to protrude radially outward in the radial direction over the entire circumference from a half portion of the one side in the axial direction of the outer-circumferential surface of the tubular portion 28.

The pair of arm portions 27 are provided so as to extend from two positions on diametrically opposite sides of the annular portion 29 of the edge of the one end in the axial direction of the annular portion 29 of the base portion 2 toward the one side in the axial direction. A pair of circular holes 30 are provided in portions near the one end in the axial direction of the pair of arm portions 27 so that the center axes are coaxial.

The outer-side yoke portion 15 is fixed to the outer tube 10a by externally fitting the tubular portion 28 of the base portion 26 around the outer-side fitting cylindrical portion 21 with a tight fit. In a state in which the outer-side yoke portion 15 is fixed to the outer tube 10a, the surface on the other end in the axial direction of the tubular portion 28 comes in contact with the outer-side stepped portion 25 of the outer tube 10a.

The outer-side yoke portion 15 can be prevented from rotation in the circumferential direction by engagement between a female serration 38 formed on the inner-circumferential surface of the tubular portion 28 and the male serration 24 of the outer-side fitting cylindrical portion 21.

Furthermore, in this example, the outer-circumferential surface of the other end portion in the axial direction of the tubular portion 28 of the outer-side yoke portion 15 and the outer-circumferential surface of the one end portion in the axial direction of the outer-side second inclined portion 20 of the outer tube 10a are fixed (welded and joined) by a welded portion 37a over the entire circumference.

In the state before the outer-side yoke portion 15 is fixed to the outer tube 10a, the inner-circumferential surface of the base portion 26 is a cylindrical surface shape having an inner-diameter dimension that does not change in the axial direction. In addition, in this state, the inner-diameter dimension of the base portion 26 is smaller than the diameter of the circumscribed circle of the convex portions of the male serration 24 formed on the outer-circumferential surface of the outer-side fitting cylindrical portion 21. The base portion 26 of the outer-side yoke portion 15 is pressure fitted with the outer-circumferential surface of the outer-side fitting cylindrical portion 21 from the one side in the axial direction, and the surface of the other end in the axial direction of the base portion 26 is brought into contact with the outer-side stepped portion 25. With this pressure fit of the base portion 26 onto the outer-circumferential surface of the outer-side fitting cylindrical portion 21, the inner-circumferential surface of the base portion 26 is drawn and plastically deformed by the convex portions of the male serration 24. In other words, a female serration 38 is formed on the inner-circumferential surface of the base portion 26.

It should be noted that in the assembled state illustrated in FIG. 1, bottomed cylindrical bearing cups 31 are internally fitted and fixed inside the pair of circular holes 30, respectively. Inside the bearing cups 31, the end portions of a pair of shaft portions 34 of four shaft portions 34 of a cross shaft 33 are respectively supported via a plurality of needles 32 so as to be able to rotate.

Of the four shaft portions 34 of the cross shaft 33, the end portions of the remaining pair of shaft portions 34 (portions other than the shaft portions 34 supported in the pair of circular holes 30 of the outer-side yoke portion 15) are supported inside circular holes (not illustrated), which are formed in a pair of arm portions 36 of a yoke 35 that is supported by and fixed to the base-end portion (rear-end portion) of the input shaft 6, via bearing cups and needles so as to be able to rotate freely.

Incidentally, in this example, construction in which the outer-side yoke portion 15 and the outer tube 10a are separate members is adopted, however, construction in which the outer tube and the outer-side yoke portion are integrated may also be adopted.

The inner shaft 9a is made of, for example, a carbon steel pipe for machine structures standardized by JIS standard (JIS G 3445), and preferably a STKM material made of metal having a carbon content of 0.35% by mass or less such as STKM 12B (carbon content: 0. 20% by mass or less), STKM 13A (carbon content: 0.25% by mass or less), STKM 15A (carbon content: 0.25% by mass to 0.35% by mass) or the like, with both sides open in the axial direction thereof having a hollow shaft shape. The inner shaft 9a includes, in order from the one side in the axial direction, a spline-formed cylindrical portion 39, an inner-side first large-diameter cylindrical portion 40, an inner-side small-diameter cylindrical portion 41 as a small-diameter portion, an inner-side second large-diameter cylindrical portion 42, and an inner-side fitting cylindrical portion 43. By applying a carbon steel pipe for machine structures having a carbon content of 0.35% by mass or less to the inner shaft 9a, the inner shaft 9a can be made to have an appropriate rigidity while taking into consideration for a function obtained by providing a small-diameter portion (the inner-side small-diameter cylindrical portion 41) to be described later.

The spline forming cylindrical portion 39 is provided on the one side in the axial direction of the inner shaft 9a, or in other words, from the one end portion in the axial direction of the inner shaft 9a to the middle portion in the axial direction. The spline forming cylindrical portion 39 has a male spline portion 45 on the outer-circumferential surface that includes a plurality of concave portions (not shown) and convex portions 44, each extending in the axial direction.

A large-diameter cylindrical surface 46 of a large-diameter hole portion, a first continuous stepped portion 47, and a medium-diameter cylindrical surface 48 of a middle-diameter hole portion having an inner-diameter dimension that is smaller than that of the large-diameter hole portion are provided in that order from the one side in the axial direction on the inner-circumferential surface of the spline forming cylindrical portion 39.

The large-diameter cylindrical surface 46 is formed from the one end portion in the axial direction to the middle portion in the axial direction of the inner circumferential surface of the spline forming cylinder portion 39. The large-diameter cylindrical surface 46 has a cylindrical surface shape, the inner diameter dimension of which does not change in the axial direction.

The first-continuous stepped portion 47 is located on the other side in the axial direction of the large-diameter cylindrical surface 46 and has a conical surface shape of which the inner-diameter dimension decreases going toward the other side in the axial direction. The edge of the one end in the axial direction (edge of the outer end in the radial direction) of the first continuous step portion 47 is continuous with the edge of the other end in the axial direction of the large-diameter cylindrical surface 46.

The medium-diameter cylindrical surface 48 is located on the other side in the axial direction of the first continuous step portion 47, or in other words, in the portion near the other end in the axial direction from the middle portion in the axial direction of the inner-circumferential surface of the spline-formed cylinder portion 39, and as an inner-diameter dimension that is smaller than the inner-diameter dimension of the large-diameter cylindrical surface 46, and has a cylindrical surface shape, the inner-diameter dimension of which does not change in the axial direction. The edge of the one end in the axial direction of the medium-diameter cylindrical surface 48 is continuous with the edge of the other end in the axial direction (edge of the inner end in the radial direction) of the first continuous stepped portion 47. In this example, the dimension in the axial direction of the medium-diameter cylindrical surface 48 is smaller than the dimension in the axial direction of the large-diameter cylindrical surface 46. More specifically, for example, the dimension in the axial direction of the medium-diameter cylindrical surface 48 can be about ⅕ to ½ the dimension in the axial direction of the large-diameter cylindrical surface 46. Incidentally, in the example illustrated in the figure, the dimension in the axial direction of the medium-diameter cylindrical surface 48 is about ⅓ the dimension in the axial direction of the large-diameter cylindrical surface 46.

The second continuous stepped portion 49 is located on the other side in the axial direction of the medium-diameter cylindrical surface 48 and has a conical surface shape in which the inner-diameter dimension decreases going toward the other side in the axial direction. The edge of the one end in the axial direction (edge of the outer end in the radial direction) of the second continuous stepped portion 49 is continuous with the edge of the other end in the axial direction of the medium-diameter cylindrical surface 48.

The portion of the spline-formed cylindrical portion 39 where the large-diameter cylindrical surface 46 is provided on the inner-circumferential surface thereof, is a thin-wall portion 76. Moreover, the portion of the spline-formed cylindrical portion 39 where the medium-diameter cylindrical surface 48 is provided on the inner-circumferential surface thereof, is a thick-wall portion 77 of which the thickness dimension in the radial direction is larger than that of the thin-wall portion 76.

The cross-sectional area of the thin portion 76 with respect to the imaginary plane orthogonal to the center axis of the inner shaft 9a is smaller than the cross-sectional area of the thick-wall portion 77 with respect to this imaginary plane.

In this example, in the case where the length dimension in the axial direction of the spline-formed cylinder portion 39 (male spline portion 45) is taken to be $L_{39}$, the edge of the other end in the axial direction of the thin-wall portion 76 is arranged at a position (0.6 to 0.9)×$L_{39}$ from the edge of the one end in the axial direction of the spline-formed cylindrical portion 39 (male spline portion 45).

The edge of the one end in the axial direction of the inner-side first large-diameter cylindrical portion 40 is integrally continuous with the edge of the other end in the axial direction of the spline-formed cylindrical portion 39. The inner-circumferential surface of the inner-side first large-diameter cylindrical portion 40 has an inner-diameter dimension that is smaller than the inner-diameter dimension of the medium-diameter cylindrical surface 48 and smaller than the inner-diameter dimension of the large-diameter cylindrical surface 46, and includes a cylindrical shaped small-diameter cylindrical surface 50 having an inner-diameter dimension that does not change in the axial direction. Therefore, the edge of the one end in the axial direction of the inner-circumferential surface (small-diameter cylindrical surface 50) of the inner-side first large-diameter cylindrical portion 40 is continuous with the edge of the other end in the axial direction (edge of the inner end in the radial direction) of the second continuous stepped portion 49. The outer-circumferential surface of the inner-side first large-diameter cylindrical portion 40 is a cylindrical surface shape, the outer diameter dimension of which does not change in the axial direction.

The inner-side small-diameter cylindrical portion 41 is provided at the middle portion in the axial direction of the inner shaft 9a. More specifically, the inner-side small-diameter cylindrical portion 41 is arranged at a position of the inner shaft 9a shifted toward the other side in the axial direction from the portion where the male spline portion 45 is provided. In a state in which the inner shaft 9a and the outer tube 10a are combined, and in the state of normal use, the inner-side small-diameter cylindrical portion 41 is arranged so as to be positioned further on the other side in the axial direction than the edge of the other end in the axial direction of the outer tube 10a. The edge of the one end in the axial direction of the inner-side small-diameter cylindrical portion 41 is integrally continuous with the edge of the other end in the axial direction of the inner-side first large-diameter cylindrical portion 40. The edge of the other end in the axial direction of the inner-side small-diameter cylindrical portion 41 is integrally continuous with the edge of the one end in the axial direction of the inner-side second large-diameter cylindrical portion 42. The inner-circumferential surface of the inner-side small-diameter cylindrical portion 41 has a cylindrical surface shape, the inner-diameter dimension of which does not change in the axial direction. The inner-diameter dimension of the inner-side small-diameter cylindrical portion 41 is equal to the inner-diameter size of the inner-side first large-diameter cylindrical portion 40 and the inner-diameter dimension of the inner-side second large-diameter cylindrical portion 42.

The outer-diameter dimension of the inner-side small-diameter cylindrical portion 41 is smaller than the outer-diameter dimension of the inner-side first large-diameter cylindrical portion 40 and the outer-diameter dimension of the inner-side second large-diameter cylindrical portion 42 over the entire length in the axial direction. In the assembled state, the dimensions of all the components of the intermediate shaft 4a are restricted so that the rigidity (torsional rigidity, flexural rigidity) of the inner-side small-diameter cylindrical portion 41 becomes the smallest in the intermediate shaft 4a.

In other words, when an impact load (torque) greater than a predetermined value acts on the intermediate shaft 4a in a state of use, the dimensions of the each of the component parts of the intermediate shaft 4a, including the inner-side small-diameter cylindrical portion 41, are regulated so that the inner-side small-diameter cylindrical portion 41 plastically deforms before the other component parts of the intermediate shaft 4a, or in other words, the earliest. Incidentally, the predetermined value may be, for example, a maximum torque that can be transmitted in a state of use, a value obtained by adding a safety factor to that torque, or the like.

It should be noted that even in the case where the dimension in the axial direction of the intermediate shaft 4a becomes the shortest in a normal state of use, the inner-side small-diameter cylindrical portion 41 does not overlap in the radial direction with the outer tube 10a, or in other words, is not aligned in the axial direction with the outer tube 10a. Therefore, in a normal state of use, the inner-side small-diameter cylindrical portion 41 is always exposed to the outside from the outer tube 10a.

As illustrated in FIG. 2, the outer-circumferential surface of the inner-side small-diameter cylindrical portion 41 includes in order from the one side in the axial direction, a first curved surface 51, a small-diameter cylindrical-surface portion 52, and a second curved surface 53.

The first curved surface 51 corresponds to a continuous curved surface portion, and is a concave curved surface inclined inward in the radial direction going toward the other side in the axial direction (the outer diameter dimension decreases). In this example, a continuous portion between the edge on the one end in the axial direction of the first curved surface 51 and the edge of the other end in the axial direction of the outer-circumferential surface of the inner-side first large-diameter cylindrical portion 40 is an angular portion, and the edge on the one end in the axial direction of the first curved surface 51 and the edge of the other end in the axial direction of the outer-circumferential surface of the inner-side first large-diameter cylindrical portion 40 are not smoothly continuous. The edge of the other end in the axial direction of the first curved surface 51 (edge of the inner end in the radial direction) is smoothly continuous with the edge of the one end in the axial direction of the small-diameter cylindrical-surface portion 52. In other words, the tangential direction at the edge of the other end in the axial direction of the cross section of the first curved surface 51 is the tangential direction at the one end in the axial direction of the cross section of the small-diameter cylindrical-surface portion 52, or in other words, is parallel with the axial direction of the inner shaft 9a. Incidentally, the radius of curvature of the first curved surface 51 is preferably 2 mm (R2) or more. In this example, the radius of curvature of the first curved surface 51 is 8 mm (R8).

The small-diameter cylindrical-surface portion 52 corresponds to a cylindrical-surface portion, and has a cylindrical surface shape, the outer-diameter dimension of which does not change in the axial direction. The outer-diameter dimension $D_{52}$ of the small-diameter cylindrical-surface portion 52 is smaller than the outer-diameter dimension $D_{40}$ of the inner-side first large-diameter cylindrical portion 40 ($D_{52}<D_{40}$), and is smaller than the outer-diameter dimension $D_{42}$ of the inner-side second large-diameter cylindrical portion 42 ($D_{52}<D_{42}$). In this example, the outer-diameter dimension $D_{52}$ of the small-diameter cylindrical-surface portion 52, in the assembled state illustrated in FIG. 1, is the smallest outer-diameter dimension among the outer-circumferential surfaces of the outer tube 10a and the inner shaft 9a (portion excluding the inner-side fitting cylindrical portion 43). The edge of the one end in the axial direction of the small-diameter cylindrical-surface portion 52 is smoothly continuous with the edge of the other end in the axial direction of the first curved surface 51. Incidentally, regarding the inner-side fitting cylindrical portion 43, the outer-diameter dimension thereof is smaller than the outer-diameter dimension $D_{52}$ of the small-diameter cylindrical-surface portion 52 when viewed only by the inner shaft 9a. However, in a state where the inner-side yoke portion 16 is fixed, the rigidity of the inner-side fitting cylindrical portion 43 is larger than the rigidity of the small-diameter cylindrical-surface portion 52. Moreover, in regards to the thin-wall portion 76 of the spline forming cylinder portion 39 where the large diameter cylindrical surface 46 is provided on the inner-circumferential surface, the thickness in the radial direction is smaller than the thickness in the radial direction of the portion of the inner-side small-diameter cylindrical portion 41 where the small-diameter cylindrical-surface portion 52 is provided on the outer peripheral surface, when viewed only by the inner shaft 9a. However, in a state in which the inner shaft 9a is combined with the outer tube 10a, the rigidity of the thin-wall portion 76 is larger than the rigidity of the small-diameter cylindrical surface portion 52.

The second curved surface 53 corresponds to a continuous curved surface portion, and is a concave curved surface inclined outward in the radial direction (the outer-diameter dimension increases) going toward the other side in the axial direction. In this example, the second curved surface 53 has a shape symmetrical with the first curved surface 51 with respect to a virtual plane orthogonal to the center axis of the inner shaft 9a. The edge of the one end in the axial direction (edge of the inner end in the radial direction) of the second curved surface 53 is smoothly continuous with the edge of the other end in the axial direction of the small-diameter cylindrical-surface portion 52. In other words, the tangential direction at the one end in the axial direction of the cross section of the second curved surface 53 is parallel to the tangential direction at the other end in the axial direction of the cross section of the small-diameter cylindrical-surface portion 52, or in other words, is parallel with the axial direction of the inner shaft 9a. In this example, the continuous portion between the edge of the other end in the axial direction of the second curved surface 53 and the edge of the one end in the axial direction of the outer-circumferential surface of the inner-side second large-diameter cylindrical portion 42 is an angular portion, and thus the edge of the other end in the axial direction of the second curved surface 53 and the edge of the one end in the axial direction of the outer-circumferential surface of the inner-side second large-diameter cylindrical portion 42 are not smoothly continuous. Incidentally, the radius of curvature of the second curved surface 53 is preferably 2 mm (R2) or more. In this example, the radius of curvature of the second curved surface 53 is 8 mm (R8).

In this example, the thickness dimension in the radial direction of the portion of the inner-side small-diameter cylindrical portion 41 corresponding to the first curved surface 51 decreases going toward the other side in the axial direction. The thickness dimension in the radial direction of the portion of the inner-side small-diameter cylindrical portion 41 corresponding to the second curved surface 53 decreases going toward the one side in the axial direction. The thickness dimension $T_{52}$ in the radial direction of the portion of the inner-side small-diameter cylindrical portion 41 corresponding to the small-diameter cylindrical-surface portion 52 is smaller than the thickness dimension $T_{40}$ in the radial direction of the inner-side first-large diameter cylindrical portion 40 ($T_{52}<T_{40}$) and smaller than the thickness dimension $T_{42}$ in the radial direction of the inner-side second large-diameter cylindrical portion 42 ($T_{52}<T_{42}$).

The inner-side second large-diameter cylindrical portion 42 is provided on the other side in the axial direction of the inner-side small-diameter cylindrical portion 41 of the inner shaft 9a. The edge of the one end in the axial direction of the inner-side second large-diameter cylindrical portion 42 is integrally continuous with the edge of the other end in the axial direction of the inner-side small-cylindrical portion 41. The inner-circumferential surface of the inner-side second large-diameter cylindrical portion 42 is a cylindrical surface shape, the inner-diameter dimension of which does not change in the axial direction, and the inner-diameter dimension of the inner-side second large-diameter cylindrical portion 42 is equal to the inner-diameter dimension of the inner-side small-diameter cylindrical portion 41. The outer-circumferential surface of the inner-side second large-diameter cylindrical portion 42 has a cylindrical surface shape, the outer-diameter dimension of which does not change in the axial direction.

The inner-side fitting cylindrical portion 43 is provided at the other end portion in the axial direction of the inner shaft 9a. The inner-side fitting cylindrical portion 43 is provided with a male serration 55 which is formed around the outer-circumferential surface by alternately arranging a plurality of concave portions (not illustrated) and convex portions (not illustrated), each extending in the axial direction. The edge of the one end in the axial direction of the outer-circumferential surface (male serration 55) of the inner-side fitting cylindrical portion 43 and the edge of the other end in the axial direction of the inner-side second large-diameter cylindrical portion 42 are continuous via an inner-side stepped portion 56.

The inner-side yoke portion 16 has a base portion 57 and a pair of arm portions 58.

The base portion 57 includes, for example, a tubular portion 59 having a cylindrical or rectangular tubular shape, and an annular portion 60.

The annular portion 60 is provided so as to protrude outward in the radial direction over the entire circumference from the half portion of the other side in the axial direction of the outer-perimeter surface of the tubular portion 59.

The pair of arm portions 58 are provided so as to extend from the two positions on opposite sides in the diametrical direction of the base portion 57 of the edge of the other end in the axial direction of the base portion 57. A pair of circular holes 61 are provided in a portion near the other end in the axial direction of the pair of arm portions 58 so that the center axes thereof are coaxial.

The inner-side yoke portion 16 is fixed to the inner shaft 9a by externally fitting the base portion 57 to the inner-side fitting cylindrical portion 43 with a tight fit. In a state in which the inner-side yoke portion 16 is fixed to the inner shaft 9a, the base portion 57 is such that the surface on the one end in the axial direction comes in contact with the inner-side stepped portion 56 of the inner shaft 9a. The inner-side yoke portion 16 can be prevented from rotation in the circumferential direction by engagement between a female serration 62 formed on the inner-circumferential surface of the tubular portion 59 and the male serration 55 of the inner-side fitting cylindrical portion 43.

In this example, the outer-circumferential surface of the one end portion in the axial direction of the tubular portion 59 of the inner-side yoke portion 16 and the outer-circumferential surface of the other end portion in the axial direction of the inner-side second large-diameter cylindrical portion of the inner shaft 9a are fixed (welded and joined) by a welded portion 37b over the entire circumference.

In the state before the inner-side yoke portion 16 is fixed to the inner shaft 9a, the inner-circumferential surface of the base portion 57 has a cylindrical surface shape, the inner-diameter dimension of which does not change in the axial direction. Moreover, in this state, the inner-diameter dimension of the base portion 57 is smaller than the diameter of the circumscribed circle of the convex portions of the male serration 55 formed on the outer-circumferential surface of the inner-side fitting cylindrical portion 43. The base portion 57 of the inner-side yoke portion 16 is pressure fitted with the outer-circumferential surface of the inner-side fitting cylindrical portion 43 from the other side in the axial direction so that the surface of the one end in the axial direction of the base portion 57 is brought into contact with the inner-side stepped portion 56. With the press fit of the base portion 57 onto the outer-circumferential surface of the inner-side fitting cylindrical portion 43, the inner-circumferential surface of the base portion 57 is drawn and plastically deformed by the convex portions of the male serration 55. In other words, a female serration 62 is formed on the inner-circumferential surface of the base portion 57.

In the assembled state illustrated in FIG. 1, bottomed cylindrical bearing cups 63 are internally fitted and fixed inside the pair of circular holes 61, respectively. Inside the bearing cups 63, end portions of a pair of shaft portions 66 of the four shaft portions 66 of a cross shaft 65 are supported via a plurality of needles 64 so as to rotate freely.

The end portions of the pair of shaft portions 66 other than the shaft portion 66 supported in the circular holes 61 of the inner-side yoke portion 16 of the four shaft portions 66 of the cross shaft 65 are supported inside circular holes (not illustrated), which are formed in a pair of arm portions 68 of a yoke 67 that is supported and fixed to the front-end portion of the steering shaft 2, by bearing cups and needles (not illustrated) so as to rotate freely.

Incidentally, in the present example, the inner-side yoke portion 16, the cross shaft 65, and the yoke 67 constitute the universal joint 3c of the universal joints 3c, 3d that is arranged on the rear side (the right side in FIG. 1).

On the outer-circumferential surface of the male spline portion 45 of the inner shaft 9a, a coating layer 69 made of a synthetic resin such as polyamide resin or the like that is slippery, or in other words, has a low friction coefficient with respect to the material of the outer tube 10a, is provided.

Hereinafter, a method of manufacturing the inner shaft 9a will be briefly described.

First, a material made of carbon steel pipe for machine structures such as STKM 12B, STKM 13A, STKM 15A, or the like is expanded to produce an intermediate member having a portion other than the inner-side small-diameter cylindrical portion 41 of the inner shaft 9a illustrated in FIG. 1. When expanding the diameter of the material, a male spline portion 45 is formed by rolling on the outer-circumferential surface of the portion corresponding to the spline-formed cylinder portion 39. However, the male spline portion 45 can be formed in another process.

Next, a portion of the outer-circumferential surface of the intermediate member corresponding to the inner-side small-diameter cylindrical portion 41 is subjected to a cutting process to form the inner-side small-diameter cylindrical portion 41, completing the inner shaft 9a.

Continuing, a portion of the inner shaft 9a on which the male spline portion 45 is formed, is immersed (dipped) in melted synthetic resin to form a coarse coating layer. Finally, a shaving process is performed on the coarse coating layer to form a coating layer 69.

In this way, by carrying out the cutting process for forming the inner-side small-diameter cylindrical portion 41 before the process of forming the coating layer 69, it is possible to prevent the cutting waste from adhering to the surface of the coating layer 69. Therefore, it is possible to prevent stick-slip, which occurs due to cutting waste adhered to the surface of the coating layer 69 from being embedded in the coating layer 69.

By engaging the male spline portion 45 and the female spline portion 23 with a spline engagement via the coating layer 69, the inner shaft 9a and the outer tube 10a are combined in a state so as to be able to transmit torque and so that the entire length is able to be extended or contracted. In a state in which the inner shaft 9a and the outer tube 10a are combined, a predetermined amount of interference is provided in the engagement portion between the male spline portion 45 and the female spline portion 23. It should be noted that although not illustrated, it is also possible to adopt a configuration in which a seal member is externally fitted and fixed to the other end portion in the axial direction of the outer tube 10a. In this case, the tip-end portion of a lip portion of the seal member is brought in contact (sliding contact) with a portion of the outer-circumferential surface of the inner shaft 9a located further on the other side in the axial direction of the male spline portion 45 (outer-circumferential surface of the inner-side first large-diameter cylindrical portion 40) so as to have an interference.

With the intermediate shaft 4a of the present example, it is possible to prevent the wheel alignment from becoming inappropriate even when an accident such as a collision accident, steered wheels riding up on a curb, or the like occurs.

In other words, in this example, the inner-side small-diameter cylindrical portion 41 is provided on the inner shaft 9a, and the rigidity (bending rigidity, torsional rigidity) of the inner-side small-diameter cylindrical portion 41 is made to be smaller than the other component parts of the intermediate shaft 4a, and of other members of the steering apparatus such as the pair of tie rods 7 and the like. Therefore, when an accident such as a collision accident, steered wheels riding up on a curb, or the like occurs and a large moment load is applied to the steered wheels, the inner-side small-diameter cylindrical portion 41 deforms before the other components of the intermediate shaft 4a or other members of the steering apparatus are deformed or damaged. As a result, deformation or damage of the other components of the intermediate shaft 4a and other members of the steering apparatus can be prevented, thereby preventing the wheel alignment from becoming improper.

In addition, in this example, in the case where the wheel alignment becomes improper, it is possible to easily determine whether or not an accident such as a collision accident, steered wheels riding up on a curb, or the like has occurred. In other word, in the case where the wheel alignment is improper in a situation where no accident such as a collision accident, steered wheels riding up on a curb, or the like has occurred, the inner-side small-diameter cylindrical portion 41 of the inner shaft 9a is not deformed. On the other hand, in the case where the wheel alignment is improper due to accident such as a collision accident, steered wheels riding up on a curb, or the like, and in the case where the torque applied to the inner-side small-diameter cylindrical portion 41 due to the accident (moment load) exceeds a predetermined value, the inner-side small-diameter cylindrical portion 41 is deformed. In this case, by determining whether or not there is deformation of the inner-side small-diameter cylindrical portion 41, it is possible to determine whether or not the cause of the wheel alignment becoming improper is due to an accident such as a collision accident, steered wheels riding up on a curb, or the like.

Moreover, in this example, the thin-wall portion 76 and the thick-wall portion 77 are provided in order starting from the one side in the axial direction in the hollow inner shaft 9a in the portion where the male spline portion 45 is provided. Therefore, it is possible to make the rigidity in the radial direction of the entire portion of the inner shaft 9a where the male spline portion 45 is provided, smaller than that in the case of a solid inner shaft. Particularly, the rigidity in the radial direction of the portion corresponding to the thin-wall portion 76 is lower than the rigidity in the radial direction of the portion corresponding to the thick-wall portion 77. Therefore, even in the case where the engagement portion between the male spline portion 45 of the inner shaft 9a and the female spline portion 23 of the outer tube 10a is provided with an interference in order to prevent looseness in the rotational direction of this engagement portion, the fluctuation of the sliding resistance (sliding load) with respect to this interference can be made insensitive and the sliding of the inner shaft 9a with respect to the outer tube 10a can be stabilized.

As described above, the inner-diameter, the length in the axial direction, and the thickness in the radial direction of each of the components of the portion where the male spline portion 45 is provided are regulated so as to have a portion with a rigidity that makes it possible to maintain the rigidity required for the inner shaft 9a, while at the same time, even in the case where interference is provided in the engagement portion between the male spline portion 45 of the inner shaft 9a and the female spline portion 23 of the outer tube 10a, to make insensitive the fluctuation of the sliding resistance (sliding load) with respect to that interference, and to stabilize sliding of the inner shaft 9a with respect to the outer tube 10a.

Second Example

Figure 3:
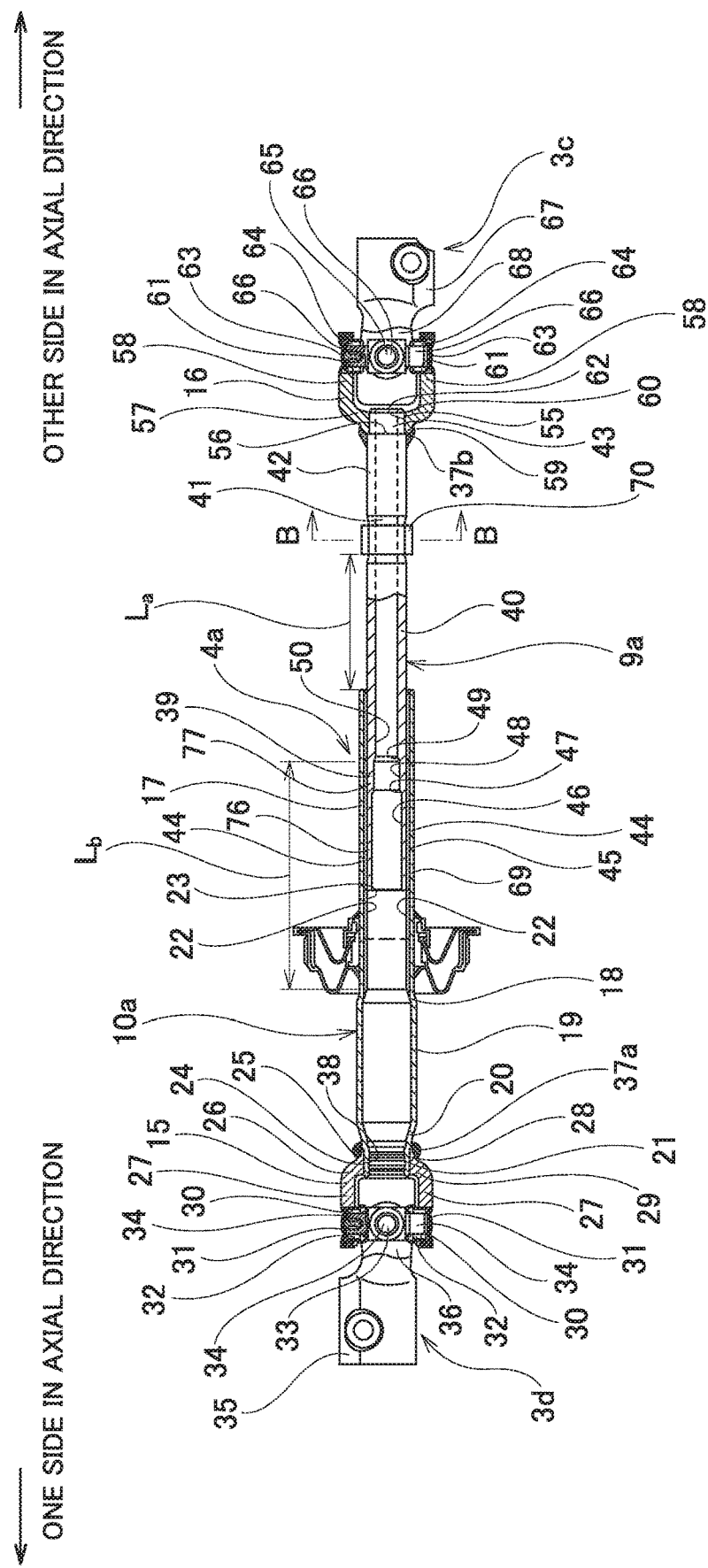
FIG. 3 is a partial cutaway side view illustrating an intermediate shaft of a second example of an embodiment of the present invention.
Figure 4:
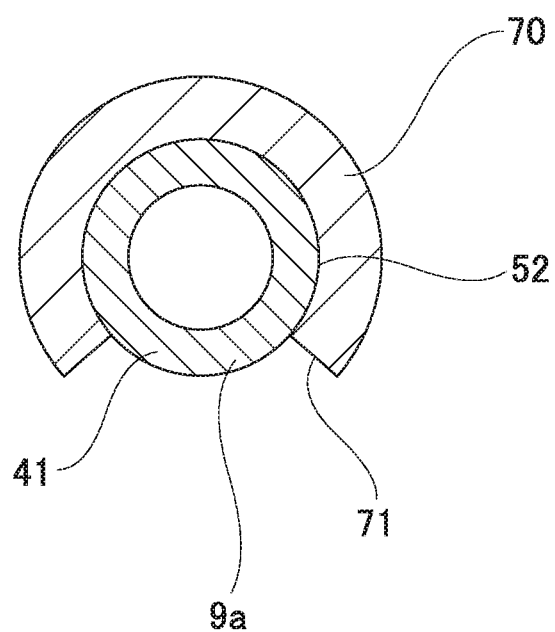
FIG. 4 is a cross-sectional view taken along the section line B-B in FIG. 3.

FIG. 3 and FIG. 4 illustrate a second example of an embodiment of the present invention. It should be noted that in this example, a synthetic resin stopper member 70 having a C-shaped cross section with a non-continuous portion 71 in a part in the circumferential direction is fitted around the outer-circumferential surface of the inner-side small-diameter cylindrical-portion 41 of the inner shaft 9a.

The stopper member 70 has the same or almost the same dimension in the axial direction as the dimension in axial direction of the small-diameter cylindrical-surface portion 52 of the inner-side small-diameter cylindrical portion 41. The stopper member 70 is externally fitted with the small-diameter cylindrical-surface portion 52 in a state of being elastically deformed so that the dimension in the circumferential direction of the non-continuous portion 71 (gap in the circumferential direction) is larger than in the free state. In a state in which the stopper member 70 is externally fitted with the small-diameter cylindrical-surface portion 52, both end portions in the axial direction of the stopper member 70 do not overlap in the radial direction the first curved surface 51 and the second curved surface 53 of the inner-side small-diameter cylindrical portion 41 (refer to FIG. 2). In other words, the stopper member 70 is not positioned on the outside in the radial direction of the first curved surface 51 and the second curved surface 53. For this reason, in the case where the stopper member 70 tries to move in the axial direction, the edges of the ends in the axial direction of the stopper member 70 come in contact with (interfere with) either the first curved surface 51 or the second curved surface 53, so it is possible to prevent the stopper member 70 from becoming detached. Incidentally, the dimension in the axial direction of the stopper member 70 is not limited to that of the illustrated construction, and an arbitrary dimension can be adopted as long as it is equal to or smaller than the dimension in the axial direction of the small-diameter cylindrical-surface portion 52.

In addition, in a state where the stopper member 70 is assembled on the inner shaft 9a, the outer-circumferential surface has a partial cylindrical surface shape, the outer-diameter dimension of which does not change in the axial direction. The outer-diameter dimension of the stopper member 70 is larger than the outer-diameter dimension of the inner-side first large-diameter cylindrical portion 40 of the inner shaft 9a, and larger than the outer-diameter dimension of the inner-side second large-diameter cylindrical portion 42. The outer-diameter dimension of the stopper member 70 is slightly smaller than the outer-diameter dimension of the outer-side small-diameter cylindrical portion 17 of the outer tube 10a. In other words, the outer-diameter dimension of the stopper member 70 is regulated so as not to become larger than necessary while maintaining a function by which the surface on the one end in the axial direction of the stopper member 70 can come in contact in the axial direction with the surface on the other end in the axial direction of the outer tube 10a. Therefore, it is possible to prevent the stopper member 70 from coming into contact with other members present around the stopper member 70. As a result, the stopper member 70 can be prevented from coming into contact with other member and being displaced from the initial assembly position (normal position).

The outer-diameter dimension of the stopper member 70 may be set to be equal to or larger than the outer-diameter dimension of the outer-side small-diameter cylindrical portion 17 of the outer tube 10a within a range where there is no contact with other members of the steering apparatus.

The stopper member 70 is provided at a position where, in a state in which the intermediate shaft 4a is contracted more than the state illustrated in FIG. 3 and the surface on the other end in the axial direction of the outer tube 10a is in contact with the surface on the one end in the axial direction of the stopper member 70, the spline engagement between the male spline portion 45 of the inner shaft 9a and the female spline portion 23 of the outer tube 10a does not slip off.

In other words, in the case where the intermediate shaft 4a is contracted more than in the state illustrated in FIG. 3, before the spline engagement between the male spline portion 45 of the inner shaft 9a and the female spline portion 23 of the outer tube 10a slips off, the surface of the other end in the axial direction of the outer tube 10a is brought into contact with the surface of the one end in the axial direction of the stopper member 70.

Furthermore, in another way of describing this, in the assembled state illustrated in FIG. 3, the distance $L_a$ between the surface of the other end in the axial direction of the outer tube 10a and the surface of the one end in the axial direction of the stopper member 70 is always smaller than the distance $L_b$ between the edge of the other end in the axial direction of the male spline portion 45 of the inner shaft 9a and the edge of the one end in the axial direction of the female spline portion 23 of the outer tube 10a ($L_a < L_b$).

According to this example, when assembling the intermediate shaft 4a, it is possible to prevent the spline engagement between the female spline portion 23 and the male spline portion 45 from slipping off and reducing the work efficiency. The configuration and operational effect of the other parts are the same as those of the first example of an embodiment.

Third Example

Figure 5:
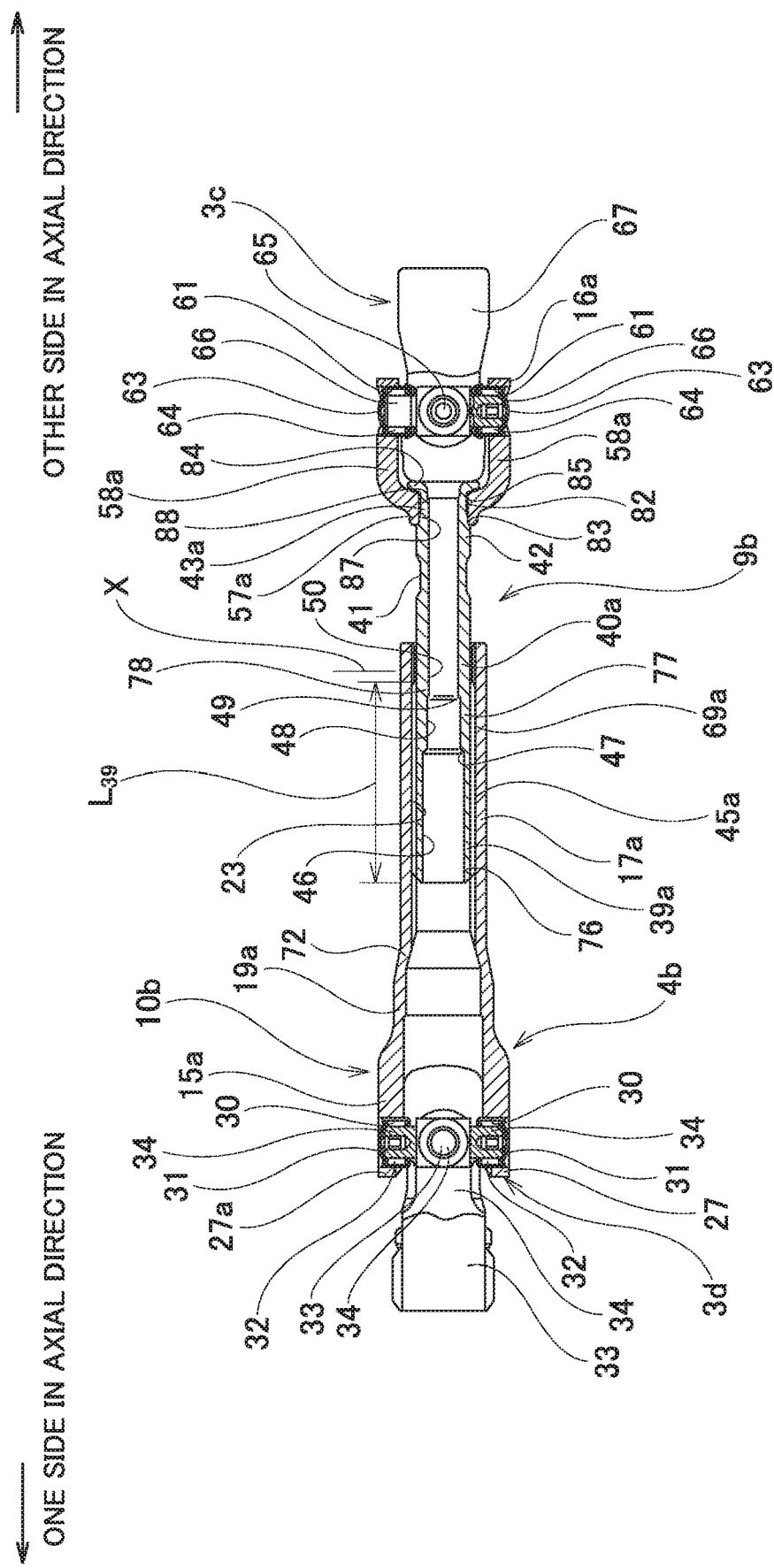
FIG. 5 is a partial cutaway side view illustrating an intermediate shaft of a third example of an embodiment of the present invention.
Figure 6:
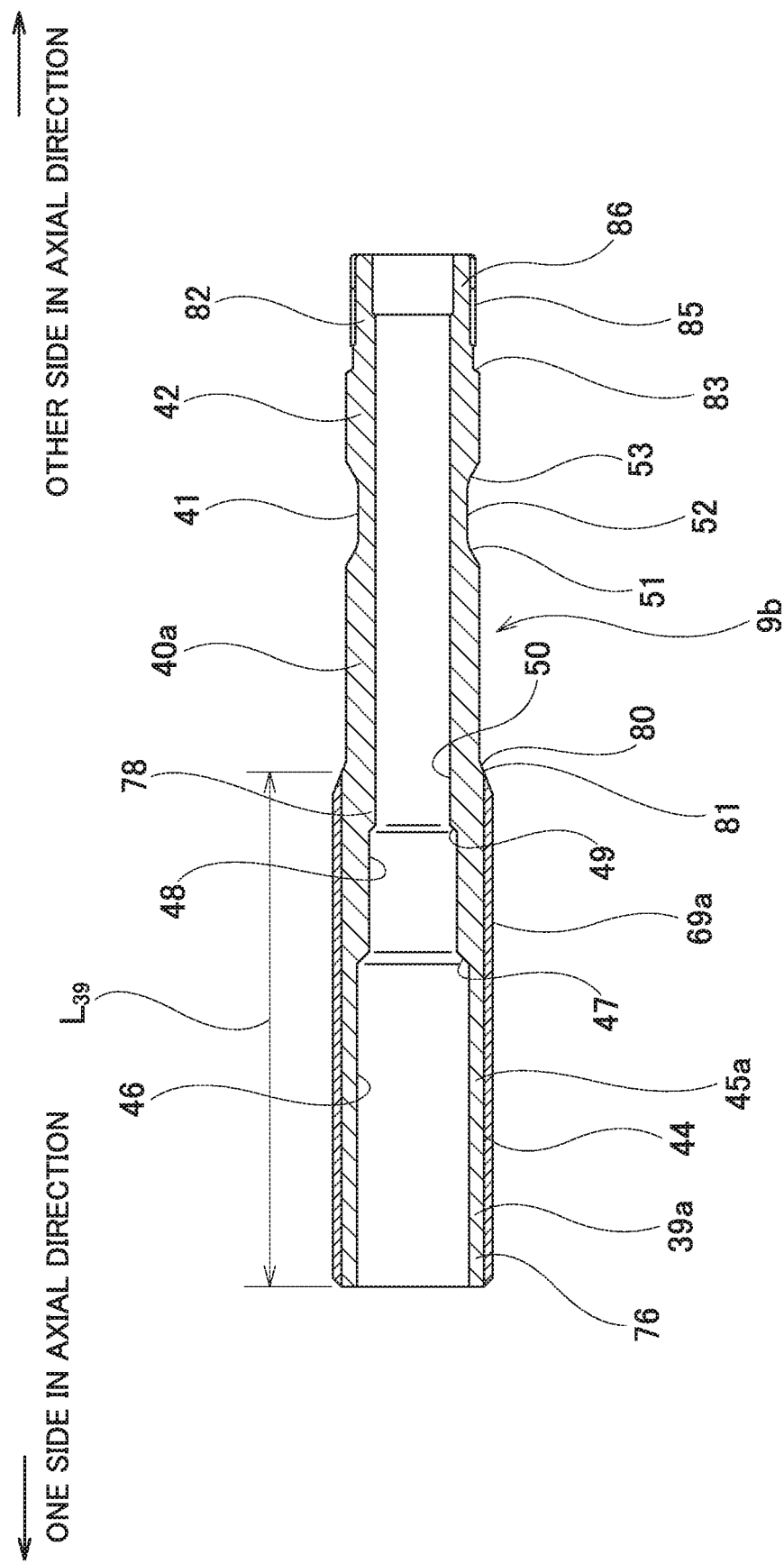
FIG. 6 is a cross-sectional view illustrating an inner shaft that has been removed in the case of the third example of an embodiment of the present invention.
Figure 7:
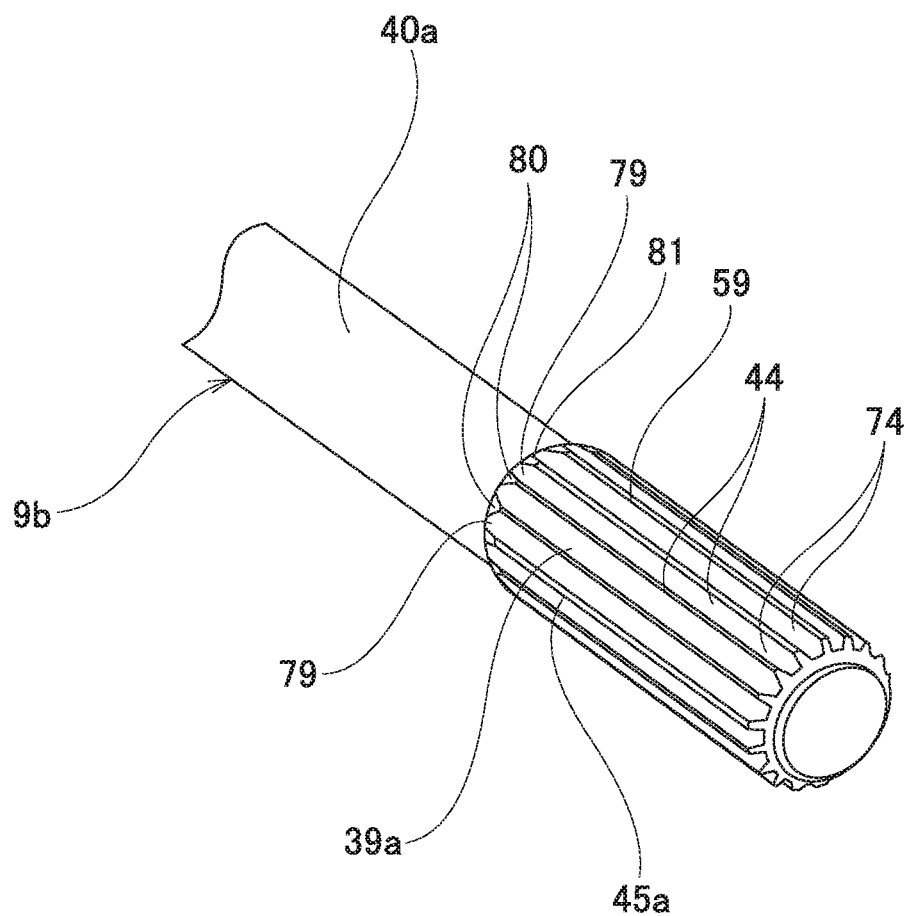
FIG. 7 is a partial enlarged perspective view illustrating an inner shaft that has been removed in the case of the third example of an embodiment of the present invention.

FIG. 5 to FIG. 7 illustrate a third example of an embodiment of the present invention. An intermediate shaft 4b of this example is also formed by combining an inner shaft 9b and an outer tube 10b so as to be able to transmit torque and so that the entire length is able to extend and contract.

The outer tube 10b includes in order starting from the other side in the axial direction an outer-side small-diameter cylindrical portion 17a, an outer-side continuous portion 72, an outer-side large-diameter cylindrical portion 19a, and an outer-side yoke portion 15a.

The outer-side small-diameter cylindrical portion 17a has a cylindrical shape and is provided in a portion from the other end portion in the axial direction to a middle portion in the axial direction of the outer tube 10b. The outer-circumferential surface of the outer-side small-diameter cylindrical portion 17a is a cylindrical surface shape, the outer-diameter dimension of which does not change over the entire length in the axial direction. The outer-side small-diameter cylindrical portion 17a has a female spline portion 23 around the inner-circumferential surface thereof, and the thickness dimension is the same over the entire length in the axial direction.

The outer-side continuous portion 72 has a partial conical cylindrical shape in which the outer-diameter dimension and the inner-diameter dimension increase going toward the one side in the axial direction, and the edge of the other end in the axial direction is continuous with the edge of the one end in the axial direction of the outer-side small-diameter cylindrical portion 17a.

The outer-side large-diameter cylindrical portion 19a has a cylindrical shape, and the edge of the other end in the axial direction is continuous with the edge of the one end in the axial direction of the outer-side continuous portion 72. The inner-diameter dimension of the outer-side large-diameter cylindrical portion 19a is larger than the inner-diameter dimension of the outer-side small-diameter cylindrical portion 17a, and the outer-diameter dimension of the outer-side large-diameter cylindrical portion 19a is larger than the outer-diameter dimension of the outer-side small-diameter cylindrical portion 17a.

The outer-side yoke portion 15a includes a pair of arm portions 27a that are provided so as to extend to the one side in the axial direction from two positions of the edge of the one end in the axial direction of the outer-side large-diameter cylindrical portion 19a on diametrically opposed sides with respect to the outer-side large-diameter cylindrical portion 19a. In other words, in this example, the outer-side yoke portion 15a is integrally provided at a portion adjacent to the one side in the axial direction of the outer-side large-diameter cylindrical portion 19a.

The inner shaft 9b has a hollow shape and includes in order starting from the one side in the axial direction a spline-formed cylindrical portion 39a, an inner-side first large-diameter cylindrical portion 40a, an inner-side small-diameter cylindrical portion 41, an inner-side second large diameter cylindrical portion 42, an inner-side fitting cylindrical portion 43a, and an inner-side yoke portion 16a.

The spline-formed cylindrical portion 39a is provided from the one end portion in the axial direction to a middle portion in the axial direction of the inner shaft 9b. The spline-formed cylindrical portion 39a has a male spline portion 45a on the outer-circumferential surface that includes a plurality each of concave portions 74 and convex portions 44 each extending along the axial direction.

On the inner-circumferential surface of the spline-formed cylindrical portion 39a, there are provided in order starting from the one side in the axial direction, a large-diameter cylindrical surface 46, a first continuous stepped portion 47, a medium-diameter cylindrical surface 48, a second continuous stepped portion 49, and a small-diameter cylindrical surface 50. Incidentally, in this example, the second continuous stepped portion 49, which is a continuous stepped portion, is positioned further on the one side in the axial direction than the outer-circumferential surface of the inner-side first large-diameter cylindrical portion 40a.

In this example, the first continuous stepped portion 47 and the second continuous stepped portion 49 have a conical surface shape that is inclined in a direction going toward the one side in the axial direction while going outward in the radial direction. Note that the first continuous stepped portion 47 and the second continuous stepped portion 49 may be partially spherical. In other words, the cross-sectional shapes of the first continuous stepped portion 47 and the second continuous stepped portion 49 with respect to an imaginary plane that includes the center axis of the inner shaft 9b can be an arc shape. More specifically, in this case, the radius of curvature R of the cross-sectional shapes of the first continuous stepped portion 47 and the second continuous stepped portion 49 with respect to the virtual plane is preferably 0.2 mm or more, and more preferably 0.5 mm or more. When the first continuous stepped portion 47 and the second continuous stepped portion 49 are partially spherical, the occurrence of stress concentration in the first continuous stepped portion 47 and the second continuous stepped portion 49 can be prevented. However, the first continuous stepped portion and the second continuous stepped portion may be provided on a virtual plane orthogonal to the center axis of the inner shaft 9b.

A portion of the spline-formed cylindrical portion 39a corresponding to the large-diameter cylindrical surface 46 is a thin-wall portion 76. The portion corresponding to the medium-diameter cylindrical surface 48 and the small-diameter cylindrical surface 50 of the spline-formed cylinder portion 39a is formed as a thick-wall portion 77 in which the thickness dimension in the radial direction is larger than the thickness dimension in the radial direction of the thin-wall portion 76. In this example, an inward-projecting portion 78 that projects further inward in the radial direction than the middle portion in the axial direction of the thick-wall portion 77 is formed around the entire circumference of the inner-circumferential surface of the other end portion in the axial direction of the thick-wall portion 77 (spline-formed cylindrical portion 39a). As a result, the thickness dimension in the radial direction of the portion of the thick-wall portion 77 where the inward-projecting portion 78 is formed is made larger than the thickness dimension in the radial direction of the other portion of the thick-wall portion 77 (portion where the inward projecting portion 78 is not formed).

The cross-sectional area of the thin-wall portion 76 with respect to an imaginary plane orthogonal to the center axis of the inner shaft 9b is smaller than the cross-sectional area of the thick-wall portion 77 with respect to the imaginary plane.

In this example, in the case where the length dimension in the axial direction of the spline-formed cylindrical portion 39a (male spline portion 45) is taken to be $L_{39}$, the edge of the other end in the axial direction of the thin-wall portion 76 is arranged at a position (0.6 to 0.9)·$L_{39}$ from the edge of the one end in the axial direction of the spline-formed cylindrical portion 39a (male spline portion 45a).

The cross-sectional area with respect to the imaginary plane of the portion of the thick-wall portion 77 where the inward-projecting portion 78 is formed is larger than the cross-sectional area with respect to the imaginary plane of the other portion of the thick-wall portion 77 (portion where the inward-projecting portion 78 is not formed).

The inner-side first large-diameter cylindrical portion 40a is provided in a portion adjacent to the other side in the axial direction of the spline-formed cylindrical portion 39a of the inner shaft 9b. The inner-side first large-diameter cylindrical portion 40a has an incomplete spline portion 81 formed on the outer-circumferential surface of the one end portion in the axial direction and includes a plurality of concave portions 79 and plurality of convex portions 80 having a right triangular cross-sectional shape with respect to a virtual plane that includes the center axis of the inner shaft 9b and are alternately arranged in the circumferential direction. The outer-circumferential surface of the convex portions 80 of the incomplete spline portion 81 is inclined in a direction in which the outer-diameter dimension becomes smaller going toward the other side in the axial direction. The edge of the one end in the axial direction of the outer-circumferential surface of the convex portions 80 of the incomplete spline portion 81 is continuous with the edge of the other end in the axial direction of the outer-circumferential surface of the convex portions 44 of the male spline portion 45a. The edge of the other end in the axial direction of the outer-circumferential surface of the convex portions 44 of the incomplete spline portion 81 is continuous with the edge of the one end in the axial direction of the outer-circumferential surface of the inner-side first large-diameter cylindrical portion 40a. Incidentally, in this example, the diameter of the circumscribed circle of the concave portions 74 of the male spline portion 45a is equal to the diameter of the circumscribed circle of the concave portions 79 of the incomplete spline portion 81.

The inner-side fitting cylindrical portion 43a has a small-diameter fitting portion 82, an inner-side stepped portion 83, and an outward-facing flange portion (crimped portion) 84.

The small-diameter fitting portion 82 is provided in a portion adjacent to the other side in the axial direction of the inner-side second large-diameter cylindrical portion 42. On the outer-circumferential surface of the small-diameter fitting portion 82, a male serration 85 is formed, which includes concave-convex portions formed by alternately arranging concave portions and convex portions in the circumferential direction. The diameter dimension of the circumscribed circle of the convex portions of the male serration 85 is smaller than the outer-diameter dimension of the inner-side second large-diameter cylindrical portion 42.

The inner-side stepped portion 83 is formed to connect the edge of the other end in the axial direction of the outer-circumferential surface of the inner-side second large-diameter cylindrical portion 42 with the edge of the one end in the axial direction of the outer-circumferential surface of the small-diameter fitting portion 82. The inner-side stepped portion 83 exists on an imaginary plane orthogonal to the center axis of the inner shaft 9b.

The outward-facing flange portion 84 is provided so as to be bent outward in the radial direction from the other end portion in the axial direction of the small-diameter fitting portion 82. The outward-facing flange portion 84 is formed, for example, by rolling crimping and expanding around the entire circumference of the other end portion in the axial direction of the inner shaft 9b (refer to FIG. 6) in the state before forming the outward-facing flange portion 84. It should be noted that a second thin-wall portion 86 having a wall thickness in the radial direction that is thinner than a portion adjacent to the one side in the axial direction is formed at the other end portion in the axial direction of the inner shaft 9b in a state before the outward-facing flange portion 84 is formed. As a result, the rigidity of the other end portion in the axial direction of the inner shaft 9b in a state before forming the outward-facing flange portion 84 is reduced, making it easier to form the outward-facing flange portion 84.

The inner-side yoke portion 16a is connected and fixed to the inner-side fitting cylindrical portion 43a. The inner-side yoke portion 16a has a cylindrical base portion 57a and a pair of arm portions 58a extending toward the other side in the axial direction from two positions of the outer-circumferential surface of the base portion 57a on opposite sides with respect to the center axis of the base portion 57a.

The base portion 57a has a center hole 87 in the center portion. On the inner-circumferential surface of the center hole 87, a female serration 88 is formed that includes concave-convex portions formed by alternately arranging concave portions and convex portions in the circumferential direction. The base portion 57a is such that, together with inserting the small-diameter fitting portion 82 through the inside of the center hole 87, the base portion 57a is held between the inner-side stepped portion 83 and the outward-facing flange portion 84 in a state in serration engagement between the female serration 88 and the male serration 85.

On the outer-circumferential surface of the male spline portion 45a of the inner shaft 9b, a coating layer 69a made of a synthetic resin which is slippery (low friction coefficient) is provided. In this example, the coating layer 69a is provided in a portion of the outer-circumferential surface of the inner shaft 9b extending from the edge of the one end in the axial direction of the spline-forming cylinder portion 39a to a portion near the one end in the axial direction of the inner-side first large-diameter cylindrical portion 40a (position indicated by straight line X in FIG. 1).

Hereinafter, a method of providing the male spline portion 45a and the coating layer 69a on the inner shaft 9b will be briefly described.

First, in a first process, the diameter of portion of a material made of carbon steel pipe for machine structures from the middle portion in the axial direction to the one end portion in the axial direction (portion corresponding to the spline-formed cylindrical portion 39a) is expanded, obtaining a first intermediate material. Incidentally, in the work of expanding the diameter, for example, a mandrel is inserted into a portion from the middle portion in the axial direction to the one end portion in the axial direction of the material, and the inner-circumferential surface of the material is drawn by the mandrel. During the work for expanding the diameter, it is also possible to arrange an outer mold having a cylindrical inner-circumferential surface on the outer-diameter side of the portion of which the diameter is to be expanded.

Next, in a second process, by performing a cutting process on the outer-circumferential surface of the diameter-expanded portion of the first intermediate material, the outer-diameter dimension of this portion is rolled (pressed) to a smaller diameter. In this way, a second intermediate material is obtained.

Next, in a third process, to the portion of the second intermediate material that was rolled (pressed) to a reduced diameter, rolling or press molding is performed to form the male spline portion 45a that is a concave-convex portion that includes concave portions and convex portions that are alternately arranged in the circumferential direction. From this a third intermediate material is obtained. Incidentally, when forming the male spline portion 45a, formation is performed in a state in which a support shaft is inserted into the inner-diameter side of the portion of the second intermediate material that was rolled (pressed) to a reduced diameter. In addition, in the above-described process, the incomplete spline portion 81 is formed together with the male spline portion 45a.

Next, in a fourth process, for example, cutting, rolling, or press molding is applied to the other end portion in the axial direction of the outer-circumferential surface of the third intermediate material, whereby the small-diameter fitting portion 82 (male serration 85) and the inner-side stepped portion 83 are formed. From this, a fourth intermediate material is obtained.

Next, in a fifth process, a cutting process is performed on a portion of the outer-circumferential surface of the fourth intermediate material corresponding to the inner-side small-diameter cylindrical portion 41 to form the inner-side small-diameter cylindrical portion 41 and obtain a fifth intermediate material.

Next, in a sixth process, a coarse coating layer is formed from the one end portion in the axial direction to the middle portion in the axial direction of the fifth intermediate material by, for example, a fluidized bed coating method, an electrostatic coating method, or the like. Then, the coating layer 69a is formed by subjecting this coarse coating layer to a shaving process. From this, a sixth intermediate material is obtained.

Next, in a seventh process, a cutting process is performed on the portion from the one end portion in the axial direction to the middle portion in the axial direction of the inner-circumferential surface of the portion of the sixth intermediate material corresponding to the male spline portion 45a, whereby the large-diameter cylindrical surface 46 (thin-wall portion 76) is formed. On the other hand, a portion from the middle portion in the axial direction to the other end portion in the axial direction of the inner-circumferential surface of a portion of the sixth intermediate material corresponding to the male spline portion 45a is taken as is to be the medium-diameter cylindrical surface 48. From this, a seventh intermediate material is obtained.

Finally, in an eighth process, the inner-side yoke portion 16a is fixed to the other end portion in the axial direction of the seventh intermediate material (the inner shaft 9b in a state before the inner-side yoke portion 16a is fixed as illustrated in FIG. 6) to become the inner shaft 9b. Incidentally, the work of connecting and fixing the inner-side yoke portion 16a to the seventh intermediate material is performed by rolling crimping and expanding around the entire circumference of the other end portion in the axial direction of the seventh intermediate material.

Note that each of the above-described processes can be replaced or performed at the same time within a range where no inconsistency occurs.

The inner shaft 9b of the present example is assembled in the outer tube 10b by a spline engagement via the coating layer 69a between the male spline portion 45a and the female spline portion 23 of the outer tube 10b over the entire length. In a state in which the inner shaft 9b and the outer tube 10b are combined, a predetermined amount of interference is provided in the engagement portion between the male spline portion 45a and the female spline portion 23. As a result, the inner shaft 9b and the outer tube 10b are combined with each other so that torque can be transmitted and the entire length can be extended and contracted.

In this example, the portion corresponding to the thick-wall portion 77 (the medium-diameter cylindrical surface 48) of the male spline portion 45a is regulated so that a spline engagement with the female spline portion 23 always exists within the range of the extending and contracting stroke of the inner shaft 9b and the outer tube 10b during use.

With the intermediate shaft 4b of this example, even in the case of adopting construction in which the looseness in the rotational direction of the engaging portion between the male spline portion 45a of the inner shaft 9b and the female spline portion 23 of the outer tube 10b is kept small, sliding resistance between the inner shaft 9b and the outer tube 10b can be kept small.

In other words, in this example, the inner shaft 9b is made to be hollow, and the thin-wall portion 76 and the thick-wall portion 77 are provided in order from the one side in the axial direction of the portion where the male spline portion 45a is formed. Therefore, compared with the case of a solid inner shaft, the rigidity in the radial direction of the portion where the male spline portion 45a is formed can be reduced. Particularly, in this example, the rigidity in the radial direction of the portion of the male spline portion 45a where the thin-wall portion 76 is formed, can be appropriately reduced as compared with the portion where the thick-wall portion 77 is formed. Therefore, in order to prevent looseness in the rotational direction of the engagement portion between the male spline portion 45a and the female spline portion 23, even in the case where an interference is provided in the engagement portion, fluctuation of the sliding resistance (sliding load) with respect to this interference can be made insensitive, and it is possible to stabilize the sliding of the inner shaft 9b with respect to the outer tube 10b.

In addition, since the rigidity in the radial direction of the male spline portion 45a can be appropriately reduced, even in the case of adopting construction in which the engagement portion is provided with an interference in order to prevent looseness in the rotation direction of the engagement portion between the male spline portion 45a and the female spline portion 23, it is possible to reduce the sliding resistance (sliding load) with respect to this interference. Moreover, fluctuation of this sliding resistance (sliding load) is made insensitive, and sliding of the inner shaft 9b with respect to the outer tube 10b can be stabilized. Furthermore, even in the case where a large allowable range (dimensional tolerance) of the error of the inner shaft 9b is maintained, it is possible to prevent the sliding resistance from becoming excessively large due to the effect of this dimensional tolerance. Therefore, it is possible to reduce the manufacturing costs of the inner shaft 9b and the outer tube 10b.

In this example, by positioning the second continuous stepped portion 49 further on the one side in the axial direction than the outer-circumferential surface of the inner-side first large-diameter cylindrical portion 40a, the inward-projecting portion 78 which projects inward in the radial direction over the entire circumference more than the one end portion in the axial direction of the thick-wall portion 77 is formed on the inner-circumferential surface of the other end portion in the axial direction of the thick-wall portion 77 (spline-formed cylindrical portion 39a). As a result, it is possible to maintain a large thickness dimension in the radial direction of the inner-side first large-diameter cylindrical portion 40a, and to improve the durability of the inner shaft 9b.

Furthermore, in this example, the portion corresponding to the medium-diameter cylindrical surface 48 (the thick-wall portion 77) of the male spline portion 45a within the range of the extending/contracting stroke between the inner shaft 9b and the outer tube 10b during use, is regulated so that a spline engagement with the female spline portion 23 always exists. Therefore, the torque transmission between the inner shaft 9b and the outer tube 10b can be performed by the portion of the inner shaft 9b where the male spline portion 45a is formed corresponding to the medium-diameter cylindrical surface 48 (thick-wall portion 77) having a relatively high rigidity in the radial direction. As a result, it is possible to improve the durability of the inner shaft 9b while improving the ability to slide. The configuration and operational effect of the other parts are the same as those of the first example and the second example of an embodiment.

Fourth Example

Figure 8:
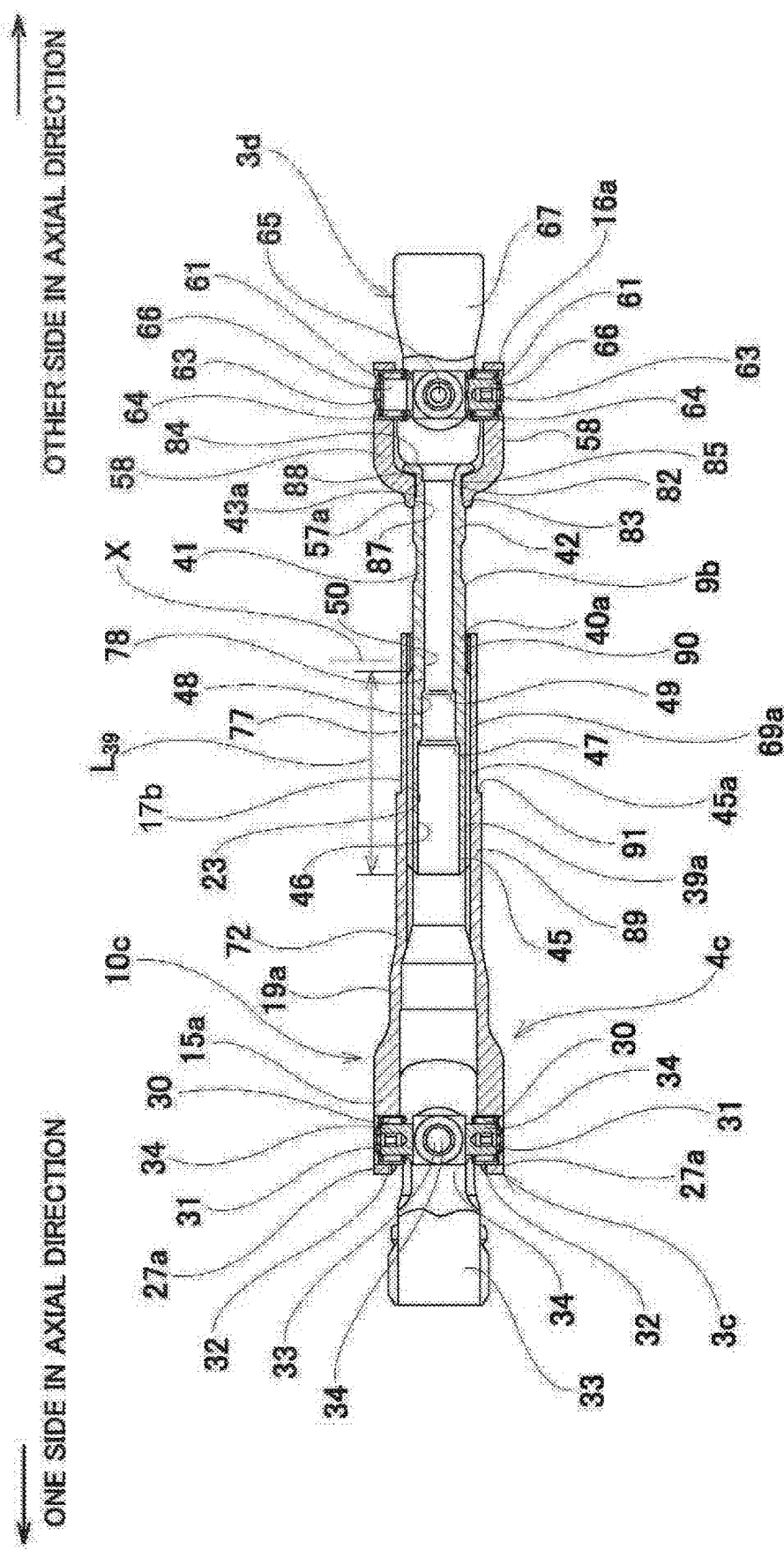
FIG. 8 is a cross-sectional view illustrating an intermediate shaft of a fourth example of an embodiment of the present invention.

FIG. 8 illustrates a fourth example of an embodiment of the present invention. An outer tube 10c of an intermediate shaft 4c of the present example includes in order starting from the other side in the axial direction an outer-side small-diameter cylindrical portion 17b, an outer-side continuous portion 72, an outer-side large-diameter cylindrical portion 19a, and an outer-side yoke portion 15a.

The outer-side small-diameter cylindrical portion 17b has a stepped cylindrical shape and is provided in a portion from the other end portion in the axial direction to the middle portion in the axial direction of the outer tube 10c. More specifically, the outer-side small-diameter cylindrical portion 17b includes a large-diameter cylindrical portion 89 provided on a half portion of the one side in the axial direction, a small-diameter cylindrical portion 90 provided on a half portion of the other side in the axial direction having an outer-diameter dimension that is smaller than the outer-diameter dimension of the large-diameter cylindrical portion 89, and an outer-side stepped portion 91 that connects the edge of the other end in the axial direction of the outer-circumferential surface of the large-diameter cylindrical portion 89 with the edge of the one end in the axial direction of the outer-circumferential surface of the small-diameter cylindrical portion 90. In addition, a female spline portion 23 is formed over the entire length of the inner-circumferential surface of the outer-side small-diameter cylindrical portion 17b.

In this example, by a male spline portion 45a of an inner shaft 9b and the female spline portion 23 of the outer tube 10c engaging by a spline engagement via a coating layer 69a, the inner shaft 9b and the outer tube 10c are combined in a state in which torque can be transmitted and the entire length can extend or contract. Incidentally, in a state where the inner shaft 9b and the outer tube 10c are combined, a predetermined amount of interference is provided in the engagement portion between the male spline portion 45a and the female spline portion 23.

In this example, the portion corresponding to the large-diameter tubular portion 89 of the female spline portion 23 of the outer tube 10c is regulated so as to always be engaged with a spline engagement with the male spline portion 45a within in a range of the extending and contracting stroke of the inner shaft 9b and the outer tube 10c during use. The configuration and operational effect of the other parts are the same as those of the first example to the third example of an embodiment.

Fifth Example

Figure 9:
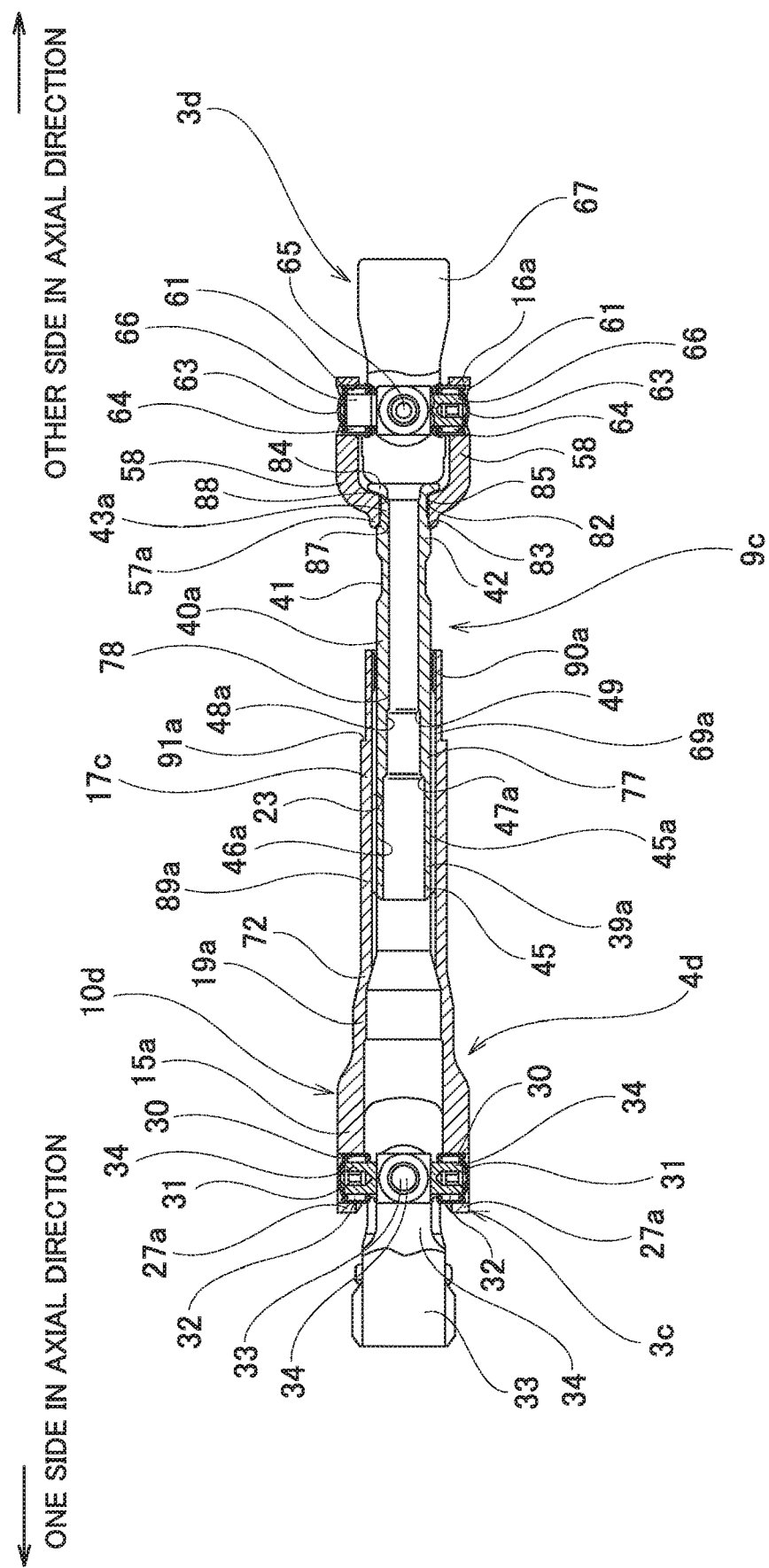
FIG. 9 is a cross-sectional view illustrating an intermediate shaft of a fifth example of an embodiment of the present invention.

FIG. 9 illustrates a fifth example of an embodiment of the present invention. An outer tube 10d of an intermediate shaft 4d of the present example includes in order starting from the other side in the axial direction an outer-side small-diameter cylindrical portion 17c, an outer-side continuous portion 72, an outer-side large-diameter cylindrical portion 19a, and an outer-side yoke portion 15a.

The outer-side small-diameter cylindrical portion 17c has a stepped cylindrical shape and is provided in a portion from the other end portion in the axial direction to the middle portion in the axial direction of the outer tube 10d. More specifically, the outer-side small-diameter cylindrical portion 17c includes a large-diameter cylindrical portion 89a provided in a portion extending from a portion near the other end in the axial direction to the one end portion in the axial direction, a small-diameter cylindrical portion 90a provided at the other end portion in the axial direction and having an outer-diameter dimension that is smaller than the outer-diameter dimension of the large-diameter cylindrical portion 89a, and an outer-side stepped portion 91a that connects the edge of the other end in the axial direction of the outer-circumferential surface of the large-diameter cylindrical portion 89a with the edge of the one end in the axial direction of the outer-circumferential surface of the small-diameter cylindrical portion 90a. In other words, in this example, the position in the axial direction of the outer-side stepped portion 91a is positioned further on the other side in the axial direction than the outer-side stepped portion 91 in the fourth example of an embodiment. Moreover, a female spline portion 23 is formed over the entire length on the inner-circumferential surface of the outer-side small-diameter cylindrical portion 17c.

In addition, in this example, the position in the axial direction of the first continuous stepped portion 47a that is formed on the inner-circumferential surface of the spline-formed cylindrical portion 39a of the inner shaft 9c and that connects the edge of the other end in the axial direction of the large-diameter cylindrical surface 46a and the edge of the one end in the axial direction of the medium-diameter cylindrical surface 48a is positioned further on the one side in the axial direction than in the case of the third example and the fourth example of an embodiment. In other words, in this example, the length dimension in the axial direction of the large-diameter cylindrical surface 46a is made shorter than in the case of the above-described third example and the fourth example of an embodiment, and the length dimension in the axial direct of the medium-diameter cylindrical surface 48a is made longer than in the case of the third example and the fourth example of an embodiment.

In this example, at least part of a portion of the female spline portion 23 of the outer tube 10d corresponding to the large-diameter cylindrical portion 89a, and at least a part of the portion of the male spline portion 45a of the inner shaft 9c corresponding to the thick-wall portion 77a (medium-diameter cylindrical surface 48a) are regulated so as to always be engaged with a spline engagement. The configuration and operational effect of the other parts are the same as those of the first example to the fourth example of an embodiment.

Example

Hereinafter, an experiment conducted to confirm the effect of the present invention will be described. In this experiment, a torsion test was performed on the inner shaft 9a of the intermediate shaft 4a of the above-described first example of an embodiment.

It should be noted that the experiment was performed under the following conditions (design values). Of the following conditions, the material diameter and the plate thickness of the material are related to the inner-side first large-diameter cylindrical portion 40 and the inner-side second large-diameter cylindrical portion 42, and the outer diameter of the small-diameter portion, the length of the small-diameter portion, the inner diameter of the small-diameter portion, the plate thickness of the small-diameter portion, the processing method of the small diameter portion, and the arithmetic mean roughness of the small-diameter portion are related to the inner-side small-diameter cylindrical portion 41. In addition, both ends R relate to the radius of curvature of the first curved surface 51 and the second curved surface 53.
[Inner Shaft Specifications]
Material: STKM 12B
Material diameter: 16.8 mm (tolerance: 0 mm to 0.2 mm)
Outer diameter of small-diameter portion: 15 mm (tolerance: −0.05 mm to 0.05 mm)
Length of small-diameter portion: 15 mm
Inner diameter of small-diameter portion: 9.4 mm (tolerance: −0.1 mm to 0.1 mm)
Material plate thickness: 3.7 mm
Plate thickness of small-diameter portion: 2.8 mm
Both end R: R 8 (8 mm)
Processing method of small-diameter portion: Cutting
Arithmetic mean roughness of small-diameter portion: Ra 3.2

Note that the specifications of the above-described inner shaft are preferably selected from the following range.
[Range of Inner Shaft Specifications]
Material: STKM material (STKM 12B, STKM 13A, STKM 15A, and the like)
Material diameter: 15 mm to 18 mm
Outer diameter of small diameter portion: 14 mm to 16 mm
Length of small diameter portion: 10 mm to 50 mm
Inner diameter of small-diameter portion: 9 mm to 15 mm
Material plate thickness: 1.5 mm to 4.5 mm
Plate thickness of small-diameter portion: 1.5 mm to 3.0 mm
Both end R: 2 mm (R2) or greater Arithmetic mean roughness of small-diameter portion: Ra 15 or less, preferably Ra 6.3 or less Incidentally, in the case where STKM 12B is adopted as the material of the inner shaft, it is preferable that the tensile strength be 390 MPa or more, the yield point or the proof stress be 275 MPa or more, the elongation in the direction of the tube axis of test specimens No. 11 or No. 12 be 25% or more, and the elongation in the direction perpendicular to the tube axis of test specimen No. 5 be 20% or more.

Figure 10:
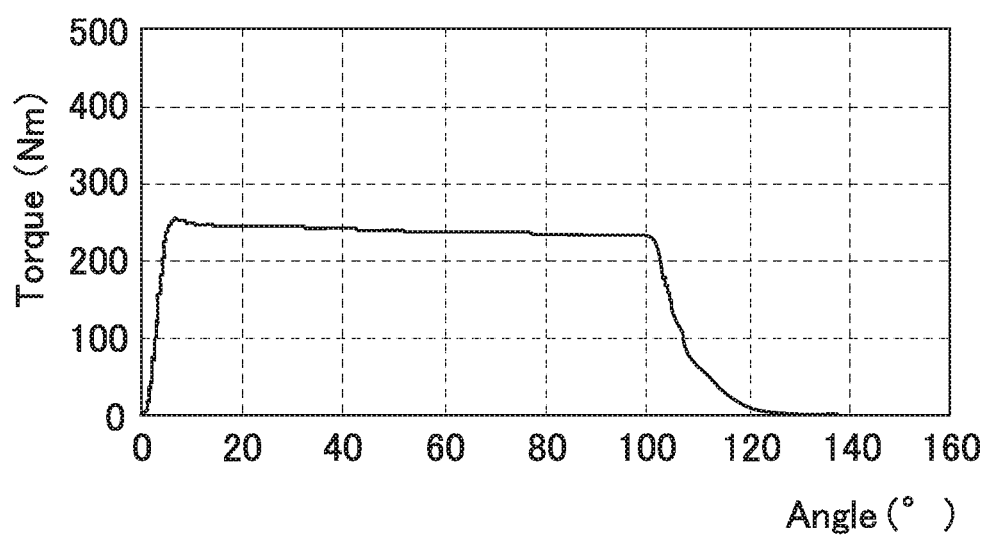
FIG. 10 is a diagram illustrating the results of an experiment performed to confirm the effect of the present invention.

FIG. 10 illustrates the results of the torsion test performed on the inner shaft 9a under the above-described conditions. It should be noted that in FIG. 10, the vertical axis indicates the magnitude of the torque and the horizontal axis indicates the twist angle.

As illustrated in FIG. 10, when the twist angle of the inner shaft 9a is about 7°, the torque reaches the yield point at about 250 Nm (yield torque). After that, the torque gradually decreases as the twist angle increases, and when the twist angle is 100°, the torque becomes 238 Nm (breaking torque) and the inner shaft 9a breaks. In addition, the energy absorption rate of the inner shaft 9a (inner-side small-diameter cylindrical portion 41) that is obtained based on the integrated value of the curve (torque/angle curve) illustrated in FIG. 10 (the surface area of the portion surrounded by the horizontal axis and the torque/angle curve in FIG. 10) was 450 J.

From the results of the experiment as described above, it was confirmed that the inner-side small-diameter cylindrical portion 41 of the inner shaft 9a is capable of transmitting torque up to about 250 Nm and can absorb 450 J of energy during plastic deformation (at rupture).

INDUSTRIAL APPLICABILITY

In each of the examples of an embodiment described above, an example was described in which the present invention is applied to an intermediate shaft of a steering apparatus. However, the present invention can also be applied to a shaft having a telescopic structure other than an intermediate shaft.

Moreover, the present invention can also be applied to an intermediate shaft that does not extend and contract in a normal state, but extends and contracts only at the time of a collision.

REFERENCE SIGNS LIST

1 Steering wheel
2 Steering shaft
3a, 3b, 3c, 3d Universal joint
4, 4q, 4b, 4c Intermediate shaft
5 Steering-gear unit
6 Input shaft
6 Tie rod
8, 8a Male spline portion
9, 9a, 9b Inner shaft
10, 10a, 10b, 10c, 10d Outer tube
11 First yoke
12 Female spline portion
13 Second yoke
14 Low-rigidity shaft
15, 15a Outer-side yoke portion
16, 16a Inner-side yoke portion
17, 17a, 17b, 17c Outer-side small-diameter cylindrical portion
18 Outer-side first inclined portion
19, 19a Outer-side large-diameter cylindrical portion 20 Outer-side second inclined portion
21 Outer-side fitting cylindrical portion
22 Convex portion
23 Female spline portion
24 Male serration
25 Outer-side stepped portion
26 Base portion
27, 27a Arm portion
28 Tubular portion
29 Annular portion
30 Circular hole
31 Bearing cup
32 Needle
33 Cross shaft
34 Shaft portion
35 Yoke
36 Arm portion
37a, 37b Welded portion
38 Female serration
39, 39a Spline-formed cylindrical portion
40, 40a Inner-side first large-diameter cylindrical portion
41 Inner-side small-diameter cylindrical portion
42 Inner-side second large-diameter cylindrical portion
43, 43a Inner-side fitting cylindrical portion
44 Convex portion
45, 45a Male spline portion
46, 46a Large-diameter cylindrical surface
47, 47a First continuous stepped portion
48, 48a Medium-diameter cylindrical surface
49 Second continuous stepped portion
50 Small-diameter cylindrical surface
51 First curved surface
52 Small-diameter cylindrical surface portion
53 Second curved surface
55 Male serration
56 Inner-side stepped portion
57, 57a Base portion
58 Arm portion
59 Tubular portion
60 Annular portion
61 Circular hole
62 Female serration
63 Bearing cup
64 Needle
65 Cross shaft
66 Shaft portion
67 Yoke
68 Arm portion
69, 69a Coating layer
70 Stopper member
71 Non-continuous portion
72 Outer-side continuous portion
74 Concave portion
76 Thin-wall portion
77, 77a Thick-wall portion
78 Inward-projecting portion
78 Concave portion
80 Convex portion
81 Incomplete spline portion
82 Small-diameter fitting portion
83 Inner-side stepped portion
84 Outward-facing flange portion
85 Male serration
86 Second thin-wall portion
87 Center hole
88 Female serration
89, 89a Large-diameter portion
90, 90a Small-diameter cylindrical portion
91, 91a Outer-side stepped portion

The invention claimed is:

1. A telescopic shaft comprising a hollow shaped outer tube arranged on one side in an axial direction thereof, and a hollow shaped inner shaft arranged on the other side in the axial direction;

the inner shaft comprising: an outer-circumferential surface, an inner-circumferential surface, and a male spline portion provided on the one side in the axial direction of the outer-circumferential surface;

the outer tube comprising: an outer-circumferential surface, an inner-circumferential surface, and a female spline portion provided on the other side in the axial direction of the inner-circumferential surface;

the inner shaft and the outer tube combined with each other by a spline engagement between the male spline portion and the female spline portion such that torque can be transmitted and the entire length of the telescopic shaft can be extended and contracted, wherein the inner shaft comprises a coating layer covering the outer-circumferential surface of the male spline portion, and the spline engagement between the male spline portion and the female spline portion is via the coating layer;

the portion of the inner shaft provided with the male spline portion has a thin-wall portion that is provided on an end on the one side in the axial direction, and a thick-wall portion that is provided further on the other side in the axial direction than the thin-wall portion, the thick-wall portion having a thickness dimension in a radial direction of the telescopic shaft that is larger than a thickness dimension in the radial direction of the thin-wall portion;

the inner-circumferential surface of the inner shaft comprises a large-diameter hole portion that is the inner-circumferential surface of the thin-wall portion, a medium-diameter hole portion that is located further on the other side in the axial direction than the large-diameter hole portion and is the inner-circumferential surface of the thick-wall portion, and a small-diameter hole portion that is located further on the other side in the axial direction than the medium-diameter hole portion and is the inner-circumferential surface of a portion shifted in the axial direction from the male spline portion of the inner shaft; and by positioning in the axial direction a continuous stepped portion that is located between the medium-diameter hole portion and the small-diameter hole portion further on the one side in the axial direction than an edge of the other end in the axial direction of the male spline portion, an inward-projecting portion that projects inward in the radial direction around the entire circumference and has an inner-circumferential surface continuing to the inner-circumferential surface of the small-diameter hole portion in the axial direction is provided on an end of the other side in the axial direction of the inner-circumferential surface of the male spline portion.

2. The telescopic shaft according to claim 1, wherein, at least part of the portion of the male spline portion where the thick-wall portion is formed on the outer-circumferential surface is always engaged with the female spline portion with a spline engagement within the range of the extending and contracting stroke of the inner shaft and the outer tube during use.

3. The telescopic shaft according to claim 1, wherein a yoke portion is connected to and fixed to the inner shaft by an outward-facing flange portion that is provided on the end of the other side in the axial direction of the inner shaft.

4. The telescopic shaft according to claim 1, wherein
the inner shaft comprises a small-diameter portion provided in a middle portion in the axial direction that is located further on the other side in the axial direction than the male spline portion, or in a middle portion in the axial direction on the other side in the axial direction of the inner shaft, and having an outer-diameter dimension that is smaller than the adjacent portions on both sides in the axial direction of the small-diameter portion;
the outer-circumferential surface of the small-diameter portion has a cylindrical surface portion, the outer-diameter dimension of which does not change in the axial direction, and a pair of continuous curved surface portions formed in portions adjacent to both sides in the axial direction of the cylindrical surface portion; and
each of the pair of continuous curved surface portions has an outer-diameter dimension that becomes small going toward the cylindrical surface portion, and the edge of the end in the axial direction on the side close to the cylindrical surface portion smoothly continues to the edge of the end in the axial direction of the cylindrical surface potion.

5. The telescopic shaft according to claim 4, wherein the inner shaft further comprises a stopper member around the small-diameter portion that is capable of engaging in the axial direction with the other end portion in the axial direction of the outer tube directly or via another member.

6. The telescopic shaft according to claim 4, wherein the cross-sectional area of the thick-wall portion and the cross-sectional area of the portion between the small-diameter portion and the male spline portion are the same.

7. The telescopic shaft according to claim 4, wherein
the inner shaft is made of a carbon steel for machine structures having a carbon content of 0.35% by mass or less; and
the outer diameter of the portions adjacent to both sides in the axial direction of the small-diameter portion is 15 mm to 18 mm, the outer diameter of the cylindrical surface portion is 14 mm to 16 mm, the length in the axial direction of the small-diameter portion is 10 mm to 50 mm, the inner diameter of the small-diameter portion is 9 mm to 15 mm, the thickness in the radial direction of the portions adjacent to both sides in the axial direction of the small-diameter portion is 1.5 mm to 3.0 mm, and the radius of curvature of the cross-sectional shape of the continuous curved portion is 2 mm or more.

* * * * *